United States Patent
Akiyama et al.

(10) Patent No.: US 8,766,965 B2
(45) Date of Patent: *Jul. 1, 2014

(54) DISPLAY DEVICE

(71) Applicants: Japan Display Inc., Chiba (JP); Panasonic Liquid Crystal Display Co., Ltd., Hyogo-ken (JP)

(72) Inventors: Kenichi Akiyama, Mobara (JP); Yoshihiro Kotani, Chiba (JP); Hiroko Sehata, Oamishirasato (JP); Kouichi Kotera, Kokubunji (JP)

(73) Assignees: Japan Display Inc., Tokyo (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,755

(22) Filed: Jun. 19, 2013

(65) Prior Publication Data

US 2013/0278579 A1    Oct. 24, 2013

Related U.S. Application Data

(63) Continuation of application No. 12/825,596, filed on Jun. 29, 2010, now Pat. No. 8,477,131.

(30) Foreign Application Priority Data

Jun. 30, 2009    (JP) ................................. 2009-155719

(51) Int. Cl.
   *G06F 3/038*    (2013.01)

(52) U.S. Cl.
   USPC ........................................................ 345/211

(58) Field of Classification Search
   None
   See application file for complete search history.

(56) References Cited

U.S. PATENT DOCUMENTS

| | | | |
|---|---|---|---|
| 6,441,763 | B1 | 8/2002 | Nakao |
| 6,535,189 | B1 | 3/2003 | Akiyama et al. |
| 7,812,752 | B2 | 10/2010 | Tsuchi et al. |
| 2007/0126689 | A1 | 6/2007 | Ishii et al. |
| 2009/0295767 | A1 | 12/2009 | Tsuchi |

FOREIGN PATENT DOCUMENTS

| | | |
|---|---|---|
| JP | 2001-034234 | 2/2001 |
| JP | 2002-043944 | 2/2002 |
| JP | 2009-104056 | 5/2009 |

*Primary Examiner* — Adam R Giesy
(74) *Attorney, Agent, or Firm* — Antonelli, Terry, Stout & Kraus, LLP.

(57) ABSTRACT

A drive circuit of a display device includes decoder circuit which outputs a voltage based on a 8-bit digital value. The decoder circuit includes a first decoder circuit and a second decoder circuit which output one voltage respectively using upper-order 6 bits of the 8-bit digital value; a selection circuit which receives voltages outputted from the first decoder circuit and the second decoder circuit, and distributes the two voltages to three terminals; and an intermediate voltage output circuit which outputs an intermediate voltage which is a one of five kinds of values based on the three voltages. The first decoder circuit and the second decoder circuit respectively include a select-switch-type decoder circuit and a tournament-type decoder circuit.

7 Claims, 23 Drawing Sheets

FIG.13

| VIN11 | VIN12 | VIN13 | VOUT2(1) | VOUT2(2) |
|---|---|---|---|---|
| VA | VA | VA | (VA+2VA+VA)/4 | VA |
| VA | VA | VB | (VA+2VA+VB)/4 | 2×VA |
| VA | VB | VA | (VA+2VB+VA)/4 | 3×VA |
| VA | VB | VB | (VA+2VB+VB)/4 | 4×VA |
| VB | VB | VB | (VB+2VB+VB)/4 | 5×VA |

FIG.15

| D1 | D0 | VIN11 | VIN12 | VIN13 |
|----|----|-------|-------|-------|
| 0  | 0  | VA    | VA    | VA    |
| 0  | 1  | VA    | VA    | VB    |
| 1  | 0  | VA    | VB    | VB    |
| 1  | 1  | VB    | VB    | VB    |

FIG.16

| D3 | D2 | VA  | VB  |
|----|----|-----|-----|
| 0  | 0  | V0  | V4  |
| 0  | 1  | V4  | V8  |
| 1  | 0  | V8  | V12 |
| 1  | 1  | V12 | V16 |

FIG.17

| VIN11 | VIN12 | VIN13 | VOUT2(1) | VOUT2(2) | VOUT2(3) |
|---|---|---|---|---|---|
| V0 | V0 | V0 | (V0+2×V0+V0)/4 | (V0+2×V0+V0)/4 | V0 |
| V0 | V0 | V4 | (V0+2×V0+V4)/4 | (V0+2×V0+5×V0)/4 | 2×V0 |
| V0 | V4 | V0 | (V0+2×V4+V0)/4 | (V0+2×5×V0+V0)/4 | 3×V0 |
| V0 | V4 | V4 | (V0+2×V4+V4)/4 | (V0+2×5×V0+5×V0)/4 | 4×V0 |
| V4 | V4 | V4 | (V4+2×V4+V4)/4 | (5×V0+2×5×V0+5×V0)/4 | 5×V0 |
| V4 | V4 | V8 | (V4+2×V4+V8)/4 | (5×V0+2×5×V0+9×V0)/4 | 6×V0 |
| V4 | V8 | V4 | (V4+2×V8+V4)/4 | (5×V0+2×9×V0+5×V0)/4 | 7×V0 |
| V4 | V8 | V8 | (V4+2×V8+V8)/4 | (5×V0+2×9×V0+9×V0)/4 | 8×V0 |
| V8 | V8 | V8 | (V8+2×V8+V8)/4 | (9×V0+2×9×V0+9×V0)/4 | 9×V0 |
| V8 | V8 | V12 | (V8+2×V8+V12)/4 | (9×V0+2×9×V0+13×V0)/4 | 10×V0 |
| V8 | V12 | V8 | (V8+2×V12+V8)/4 | (9×V0+2×13×V0+9×V0)/4 | 11×V0 |
| V8 | V12 | V12 | (V8+2×V12+V12)/4 | (9×V0+2×13×V0+13×V0)/4 | 12×V0 |
| V12 | V12 | V12 | (V12+2×V12+V12)/4 | (13×V0+2×13×V0+13×V0)/4 | 13×V0 |
| V12 | V12 | V16 | (V12+2×V12+V16)/4 | (13×V0+2×13×V0+17×V0)/4 | 14×V0 |
| V12 | V16 | V12 | (V12+2×V16+V12)/4 | (13×V0+2×17×V0+13×V0)/4 | 15×V0 |
| V12 | V16 | V16 | (V12+2×V16+V16)/4 | (13×V0+2×17×V0+17×V0)/4 | 16×V0 |
| V16 | V16 | V16 | (V16+2×V16+V16)/4 | (17×V0+2×17×V0+17×V0)/4 | 17×V0 |

| D3 | D2 | na3 | nb3 | na4 | nb4 |
|----|----|-----|-----|-----|-----|
| 0  | 0  | V0  | V4  | V0  | V4  |
| 0  | 1  | V8  | V4  | V4  | V8  |
| 1  | 0  | V8  | V12 | V8  | V12 |
| 1  | 1  | V16 | V12 | V12 | V16 |

DISPLAY DEVICE

CROSS-REFERENCE TO RELATED APPLICATION

This application is a continuation of U.S. application Ser. No. 12/825,596, filed Jun. 29, 2010, now U.S. Pat. No. 8,477,131, the contents of which are incorporated herein by reference.

The present application claims priority from Japanese application JP2009-155719 filed on Jun. 30, 2009, the content of which is hereby incorporated by reference into this application.

BACKGROUND OF THE INVENTION

1. Field of the Invention

The present invention relates to a display device, and more particularly to a decoder circuit used in a drive circuit for driving a display panel.

2. Description of the Related Art

As a display device of an information communication terminal such as a computer or a television receiver set, a liquid crystal display device has been popularly used. An organic EL (Electroluminescence) display device (OLED: Organic light-Emitting Diode), a field emission display device (FED) or the like has been also known as a planar display device. The liquid crystal display device includes a liquid crystal display panel in which liquid crystal composition is sealed in a space formed between two substrates. By changing an electric field applied to the liquid crystal composition thus changing the alignment of the liquid crystal composition, a rate at which light passes through the liquid crystal display panel is changed so that an image is displayed. A display device including such a liquid crystal display device is provided with a drive circuit which supplies tone voltages. A decoder circuit which selects voltages corresponding to tone data is mounted in the drive circuit. Recently, there is observed tendency that the decoder circuit becomes large-scaled along with a demand for the enhancement of multi-tone leading to the increase of an area which the decoder circuit occupies in a semiconductor chip. In view of the above, the reduction of a scale of the decoder circuit is demanded.

JP 2001-34234 A discloses a two-input amplifier having two inputs. In this two-input amplifier, when two inputted voltages are equal, the inputted voltages are outputted, while when two inputted voltages differ from each other, an intermediate voltage between two voltages is outputted. JP 2001-34234 A discloses a technique which reduces the number of tone lines and a scale of a decoder circuit using the two-input amplifier.

SUMMARY OF THE INVENTION

With the use of the two-input amplifier disclosed in the patent document 1, the intermediate voltage is generated by the amplifier and hence, it is possible to reduce the number of voltage values to be prepared preliminarily. Accordingly, it is possible to reduce a circuit scale of a voltage generation circuit. However, no sufficient study has been made with respect to a circuit scale of a decoder portion which selects voltage values in a stage before voltages are inputted to the amplifier.

The present invention has been made under the above-mentioned circumstances, and it is an object of the present invention to reduce a circuit scale of a decoder circuit.

The display device of the present invention includes a decoder circuit which outputs, based on an 8-bit digital value, a voltage corresponding to the digital value. The decoder circuit includes a first decoder circuit and a second decoder circuit which output one voltage respectively using upper-order 6 bits out of the 8-bit digital value. The decoder circuit further includes a data selector circuit which outputs a selection signal formed of 3-bit digital data and a selection circuit part which receives two voltages outputted from the first decoder circuit and the second decoder circuit, and distributes the two voltages to three terminals using a plurality of lower-order 2 bits out of the 8-bit digital value; and an intermediate voltage output circuit which receives three voltages which is applied on the three terminals by the selection circuit part, and outputs an intermediate voltage which is a one of five kinds of values based on the three voltages.

The first decoder circuit and the second decoder circuit respectively includes a select-switch-type decoder circuit which uses lower-order 3 bits, and a tournament-type decoder circuit which uses upper-order 3 bits.

The select-switch-type decoder circuit includes switching elements which switch an ON state in response to the selection signal, and select a desired voltage by making the switching element connected to a tone voltage corresponding to digital data conductive.

The tournament-type decoder circuit is configured to select one of two values by the switching element of the lower-order bits and to output a result obtained by selection to the switching element of upper-order bits, wherein one of branched paths is selected by the switching element corresponding to each bit thus outputting one of the plurality of inputted voltages.

Although both the select-switch-type decoder circuit and the tournament-type decoder circuit are constituted of a decoder circuit, since data to be allocated can be divided for every 3 bits, and the data selector circuit can be used in common by the first decoder circuit and the second decoder circuit, it is possible to reduce the scale of the circuit.

BRIEF DESCRIPTION OF DRAWINGS

FIG. 13 is a table of truth value showing the relationship between an input and an output of the output circuit of the liquid crystal drive circuit;

FIG. 15 is a table of truth value showing the relationship between an input and an output of a selection circuit of the liquid crystal drive circuit;

FIG. 16 is a table of truth value showing an output of the decoder circuit of the liquid crystal drive circuit;

FIG. 17 is a table of truth value showing an output of the decoder circuit of the liquid crystal drive circuit;

DETAILED DESCRIPTION OF THE INVENTION

Figure 1:
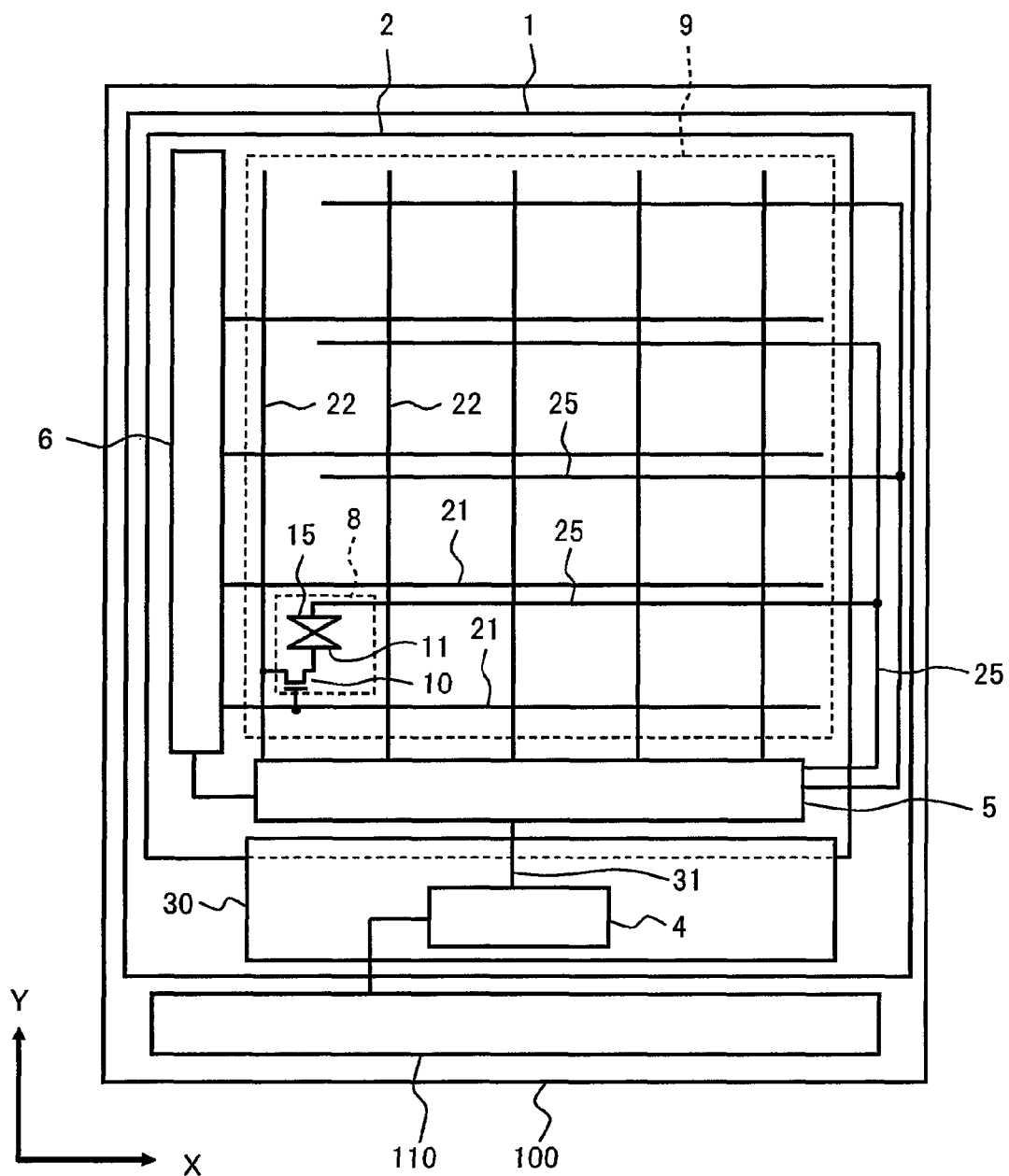
FIG. 1 is a view schematically showing a liquid crystal display device according to one embodiment of the present invention.

Hereinafter, an embodiment of the present invention is explained in conjunction with drawings. Here, in the drawings, identical or similar elements are given same symbols and their repeated explanation is omitted.

FIG. 1 is a block diagram showing the basic constitution of a liquid crystal display device of the embodiment according to the present invention. As shown in FIG. 1, the liquid crystal display device 100 of this embodiment is constituted of a liquid crystal display panel 1, a drive circuit 5, a printed circuit board 30 and a backlight 110.

The liquid crystal display panel 1 is configured as follows. A TFT substrate 2 on which thin film transistors 10, pixel electrodes 11, counter electrodes (common electrodes) 15 and the like are formed and a filter substrate (not shown in the drawing) on which color filters and the like are formed are overlapped with each other with a predetermined gap therebetween. Both substrates are adhered to each other using a frame-shaped sealing material (not shown in the drawing) arranged between both substrates and in the vicinity of peripheral portions of both substrates and, at the same time, liquid crystal composition is filled and sealed in a space defined by both substrates and the sealing material. Further, a polarizer is adhered to outer surfaces of both substrates, and the drive circuit 5 is connected to the TFT substrate 2.

Here, this embodiment is applicable to both of a so-called lateral-electric-field type (IPS type) liquid crystal display panel in which the counter electrodes 15 are arranged on the TFT substrate 2 and a so-called vertical-electric-field type (VA type) liquid crystal display panel in which the counter electrodes 15 are arranged on the filter substrate in the same manner.

As shown in FIG. 1, scanning signal lines (also referred to as gate signal lines) 21 which extend in the x direction and are arranged parallel to each other in the y direction in the drawing and video signal lines (also referred to as drain signal lines) 22 which extend in the y direction and are arranged parallel to each other in the x direction in the drawing are formed on the TFT substrate 2, and pixel portions 8 are formed in respective regions which are surrounded by the scanning signal lines 21 and the drain signal lines 22.

Here, although the liquid crystal display panel 1 includes a large number of pixel portions 8 in a matrix array, for facilitating the understanding of the drawing, only one pixel portion 8 is shown in FIG. 1. The pixel portions 8 arranged in a matrix array form a display region 9, each pixel portion 8 plays a role of a pixel of a display image, and an image is displayed in the display region 9.

The thin film transistor 10 of each pixel portion 8 has a source thereof connected to the pixel electrode 11, has a drain thereof connected to the video signal line 22, and has a gate thereof connected to the scanning signal line 21. The thin film transistor 10 functions as a switch for supplying a video signal (tone voltage) to the pixel electrode 11.

Here, although naming of "source" and "drain" may be reversed based on the relationship of biases, in this embodiment, either one of them which is connected to the video signal line 22 is referred to as the drain. Further, the pixel electrode 11 and the counter electrode 15 form a capacitance (liquid crystal capacitance).

The drive circuit 5 is arranged on a transparent insulation substrate (glass substrate, resin substrate or the like) which constitutes the TFT substrate 2. The drive circuit 5 is connected to the video signal lines 22 and counter electrode signal lines 25. Further, a scanning line drive circuit 6 is connected to the scanning signal lines 21.

A printed circuit board 30 is electrically connected to the drive circuit 5. A connector 4 and a line 31 are formed on the printed circuit board 30.

A signal from the outside is inputted to the connector 4. A signal and a power source voltage are supplied to the drive circuit 5 from the connector 4. Further, a power source voltage is supplied to a backlight 110 from the connector 4. The backlight 110 is used as a light source of the liquid crystal display device 100. Here, although the backlight 110 is arranged on a back surface of the liquid crystal display panel 1, to simplify the drawing, the backlight 110 is illustrated such that the backlight 110 is juxtaposed to the liquid crystal display panel 1 in FIG. 1.

Signals inputted to the drive circuit 5 from the connector 4 are control signals including a clock signal, a display timing signal, a horizontal synchronizing signal, a vertical synchronizing signal and the like, display data (R.G.B) and a display mode control command. The drive circuit 5 supplies signals necessary for the display to the liquid crystal display panel 1 in response to the inputted signals.

The drive circuit 5 is constituted of one chip of a semiconductor integrated circuit (LSI), and includes an output circuit of a video signal to the video signal lines 22. Further, the scanning line drive circuit 6 is formed on the TFT substrate 2. The scanning line drive circuit 6, based on a reference clock, sequentially supplies a selection voltage (scanning signal) of "High" level to the respective scanning signal lines 21 of the liquid crystal display panel 1 for every 1 horizontal scanning period. Due to such an operation, via the plurality of thin film transistors 10 connected to each scanning signal line 21 of the liquid crystal display panel 1, the video signal lines 22 and the pixel electrodes 11 are electrically conducted for 1 horizontal scanning period.

Further, the drive circuit 5 outputs a tone voltage corresponding to a tone to be displayed by the pixel to the video signal lines 22. When the thin film transistors 10 are brought into an ON (conductive) state, the tone voltage (video signal) is supplied to the pixel electrodes 11 from the video signal lines 22. Thereafter, when the thin film transistors 10 are brought into an OFF state, the tone voltage based on a video to be displayed by the pixels is held in the pixel electrodes 11.

A counter electrode voltage is applied to the counter electrode 15 via a counter electrode signal line 25 so that the potential difference is generated between the pixel electrode 11 and the counter electrode 15. Due to such potential difference, the alignment direction of liquid crystal molecules which are sandwiched between two electrodes is changed. The liquid crystal display panel 1 changes transmissivity and reflectance of light by changing the alignment direction of the liquid crystal molecules thus displaying an image.

Figure 2:
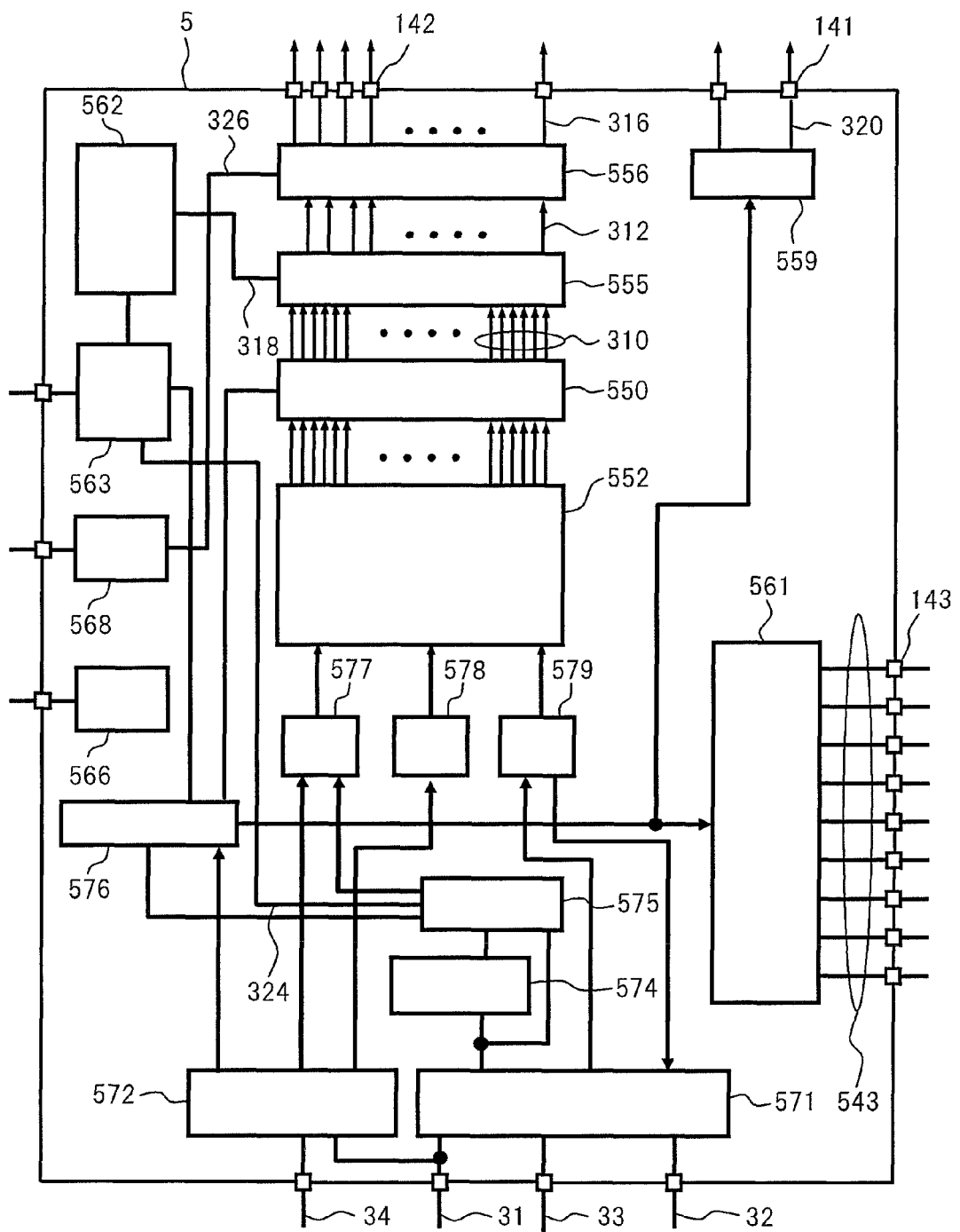
FIG. 2 is a view showing the constitution of a liquid crystal drive circuit of the liquid crystal display device shown in FIG. 1.

FIG. 2 is a block diagram showing the internal constitution of the drive circuit 5. Firstly, signals which are inputted from the outside are inputted to a system interface 571 through an input line 31. Further, some inputted signals are inputted also to an external display interface 572. On the other hand, signals and voltages necessary for driving the liquid crystal display panel 1 are outputted from a scanning signal terminal 141, a video signal output terminal 142, and a voltage output terminal 143 which constitute output terminals.

The drive circuit 5 incorporates a graphic RAM 552 therein, and display data is stored in the graphic RAM 552. In driving the liquid crystal display panel 1, the drive circuit 5 designates an address of the graphic RAM 552 corresponding to the liquid crystal display panel 1 and writes display data in the graphic RAM 552. The drive circuit 5 outputs tone voltages to the liquid crystal display panel 1 based on display data stored in the graphic RAM 552.

The drive circuit 5 has various display modes. In the drive circuit 5, various display modes are designated and various displays are performed based on signals supplied from the outside via the system interface 571. The drive circuit 5 also controls outputting of a counter electrode voltage (common voltage) or a scanning signal in response to an instruction signal, for example. In this manner, the drive circuit 5 is compatible with various display modes in response to the instruction signal. Here, to form the drive circuit 5 into one IC chip, it is necessary to suppress an area for mounting the drive circuit 5 to a small area so as to realize a multifunctional drive circuit.

Recently, there has been developed a mobile phone having various functions in addition to the various display modes, and a liquid crystal display device used in such a mobile phone is compatible with these various functions. Further, there is a tendency that the number of displayable tone is increased. In this case, various circuits are formed in the IC chip and hence, a drawback that a circuit scale is enlarged becomes apparent.

In view of the above, an attempt has been made to reduce the circuit scale of the drive circuit 5. Here, to become compatible with the various display modes, the drive circuit 5 includes registers which control the various functions, and executes the various functions by setting values of the registers.

Further, to avoid the cumbersome setting of a large number of registers, the drive circuit 5 may adopt an auto-sequential function. However, in adopting the auto-sequential function, it is necessary to preliminarily determine functions with which the drive circuit 5 is compatible and hence, the drive circuit 5 is customized for every liquid crystal display panel. Accordingly, it becomes necessary to prepare drive circuits which differ in specification for respective liquid crystal display panels.

Besides the above-mentioned constitution, an EPROM may be provided in addition to the drive circuit 5, the set values in the registers may be stored in the EPROM compatible with each liquid crystal display panel, and the respective necessary set values may be read from the EPROM by inputting an instruction signal to the drive circuit 5 from an external control circuit.

In general, setting of the instruction signal is performed via a system interface 571. The system interface 571 includes two kinds of interfaces consisting of an n-bit bus (24-bit bus, 16-bit bus or the like) and a clock-synchronous-serial. Accordingly, the system interface 571 is compatible with both of a parallel signal and a serial signal supplied from an external control circuit such as an MPU (Micro Processing Unit).

The drive circuit 5 includes an index register 574 and a control register 575 which are formed of a 16-bit register, and a write data register 578 and a read data register 579 which are formed of a 24-bit register. Data is written in or read out from the respective registers via the system interface 571. Symbol 31 indicates the input signal line, and symbol 32 indicates an output signal line. Symbol 33 indicates a verifying signal output line. The verification of input/output data can be made using a verifying signal.

Besides the above-mentioned components, the external display interface 572 includes an RGB interface and a vertical synchronizing interface for displaying a motion image, a video signal is inputted to the external display interface 572 via the input signal line 34 from the outside. When the RGB interface is operated, the external display interface 572 fetches display data in response to a vertical synchronizing signal and a horizontal synchronizing signal supplied from the outside.

When the vertical synchronizing interface is operated, the external display interface 572 synchronizes frames in response to the vertical synchronizing signal and fetches display data in response to an internal clock.

The index register 574 is a register which stores information for getting access to the control register 575 or the graphic RAM 552, and it is possible to designate an address of the control register 575 and an address of the graphic RAM 552 using the index register 574.

The control register 575 can designate the various functions of the drive circuit 5. The drive circuit 5 can control a display operation using values set in the control register 575. For example, the control register 575 allows a gamma correction circuit 563 to designate a correction value.

The write data register 578 temporarily stores data to be written in the graphic RAM 552. The write data register 578 writes the display data which is temporarily stored therein in the graphic RAM 552 via the external display interface 572 in accordance with a set value of the control register 575, a value of an address counter 577 described later, and values of various control terminals.

The read data register 579 is a register which temporarily stores data read out from the graphic RAM 552 therein. The read data register 579 outputs the data which is temporarily stored therein to the outside in accordance with a set value of the control register 575, a value of the address counter 577, and values of the various control terminals.

The address counter 577 is a counter which imparts an address to the graphic RAM 552. When an instruction for setting an address is written in the index register 574, address information is transferred to the address counter 577 from the index register 574.

The graphic RAM 552 incorporates an SRAM (Static RAM) therein, and when 1 pixel (RGB) is constituted of 24 bits, the SRAM stores bit pattern data of 1, 244, 160 bytes therein, for example, and hence, the graphic RAM 552 is compatible with a display of a size of 480×3×864 at maximum.

A timing generating circuit 576 generates timing signals for operating the internal circuits necessary for a display. That is, the timing generating circuit 576 generates interface signals such as a timing signal for reading data from the graphic RAM 552 necessary for the display and an internal operation timing signal which corresponds to an access from the outside.

A latch circuit 550 temporarily holds digital data to be outputted amounting to 480×3 pieces of video signal lines 22. When signals to be outputted are prepared in the latch circuit 550, the latch circuit 550 outputs display data to the tone voltage selection circuit 555.

The tone voltage selection circuit 555 outputs tone voltages in accordance with the inputted display data. The voltages (the tone voltages) outputted from the tone voltage selection circuit 555 are amplified in current at the output circuit 556, and outputted to the video signal output terminals 142. The detail of the constitution for reducing the circuit scale of the tone voltage selection circuit 555 is explained later.

The video signal output terminals 142 are electrically connected to the video signal lines 22 of the liquid crystal display panel 1, and the tone voltages are outputted to the video signal lines 22. The number of the video signal lines 22 to which the tone voltages are applied, a beginning line of the video signal lines 22 from which the outputting of the tone voltages are applied and the like are set in the control register 575 by instruction signals.

On the other hand, the scanning timing signals are outputted from a scanning signal generating circuit 559, and the scanning control signals are outputted via scanning signal terminals 141. The liquid crystal display panel 1 includes the scanning line drive circuit 6, and the drive circuit 5 includes a circuit for controlling the scanning line drive circuit 6.

A tone voltage generation circuit 562 generates voltages of 256 tones, for example, and supplies the voltages to the tone voltage selection circuit 555. The gamma correction circuit 563 approximates an increasing/decreasing rate of the tone voltages to a gamma function thus realizing a change of brightness suitable for the characteristics of human eyes. The gamma correction circuit 563 can control a correction quantity by designating a register value. A regulator 566 outputs a power source voltage for an internal logic circuit. Here, although lines from the regulator 566 to the respective circuits are omitted, it is assumed that required lines are connected to the respective circuits. Further, a reference voltage generating circuit 568 supplies a reference voltage to the output circuit 556.

A liquid crystal drive voltage generating circuit 561 includes a boosting circuit therein, and generates voltages necessary for driving liquid crystal from a power source voltage supplied from the outside. Through the output terminal 143 of the drive circuit 5, various voltages are supplied to the liquid crystal panel 1 and the drive circuit 5 per se.

Figure 3:
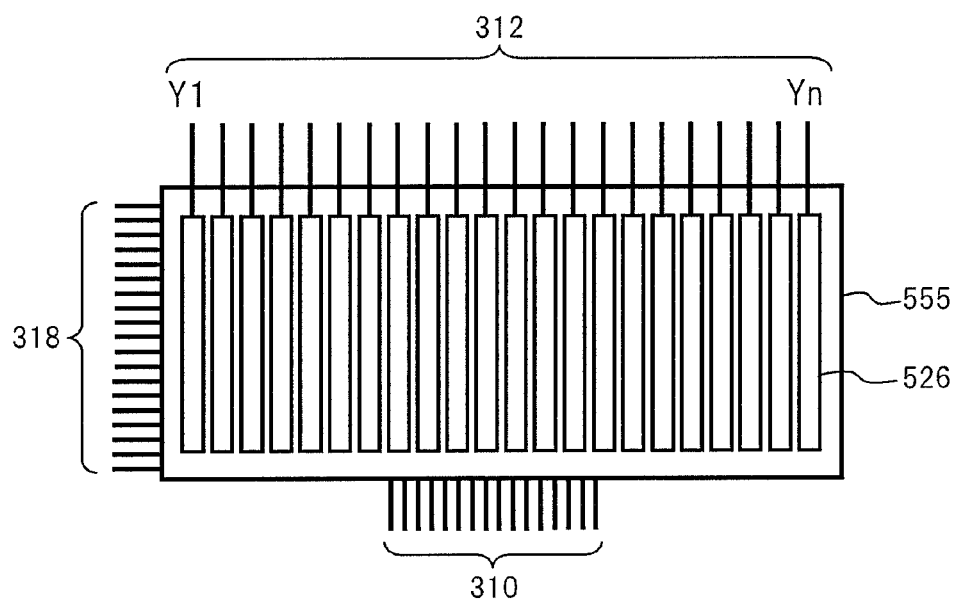
FIG. 3 is a view schematically showing the constitution of a decoder circuit of the liquid crystal drive circuit shown in FIG. 2.

FIG. 3 schematically shows the constitution of the tone voltage selection circuit 555. The tone voltages are inputted to the tone voltage selection circuit 555 via tone voltage lines 318, and display data is inputted to the tone voltage selection circuit 555 via display data lines 310. Selected tone voltages are supplied to the output circuit 556 through the output lines 312.

The tone voltage selection circuit 555 includes divided decoder segments 526 the number of which is set equal to the number of video signal lines 22 which can be driven by the drive circuit 5. For example, when the number of video signal lines 22 which can be driven by the driver 5 is 480×3 (RGB), the tone voltage selection circuit 555 includes 1440 pieces of decoder segments 526.

Each decoder segment 526 includes the output line 312 in accordance with every segment. When each output line 312 is expressed in accordance with every segment, for example, the n-th output line 312 is indicated by "Yn".

Figure 4:
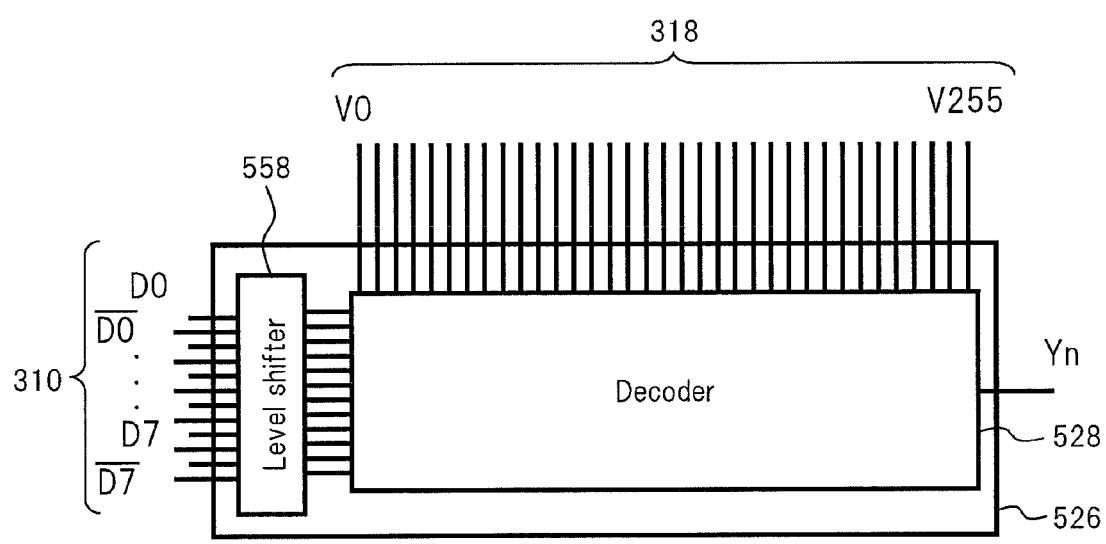
FIG. 4 is a view schematically showing the constitution of the decoder circuit of the liquid crystal drive circuit shown in FIG. 3.

FIG. 4 shows the constitution of one decoder segment 526. The decoder segment 526 includes a decoder circuit 528 and a level shift circuit 558. The level shift circuit 558 obtains voltage levels which can be used in the decoder circuit 528 by converting voltage levels of display data D0 to D7. Here, the display data D0 indicates the lowermost-order bit of 8-bit digital data and the display data D7 indicates the uppermost-order bit of the 8-bit digital data.

Although the 8-bit display data D0 to D7 are inputted to the decoder segment 526 in FIG. 4, display data having the number of bits suitable for the number of tones which can be outputted are supplied to the decoder segment 526 from the latch circuit 550 through the display data lines 310. Here, negative logic data (low active) which are formed by inverting display data D0 to D7 are indicated by Dn with a bar.

Further, although the tone voltages are inputted through the tone voltage lines 318, voltages amounting to 256 tones are supplied from the tone voltage generation circuit 562 in accordance with 8-bit display data.

Figure 5:
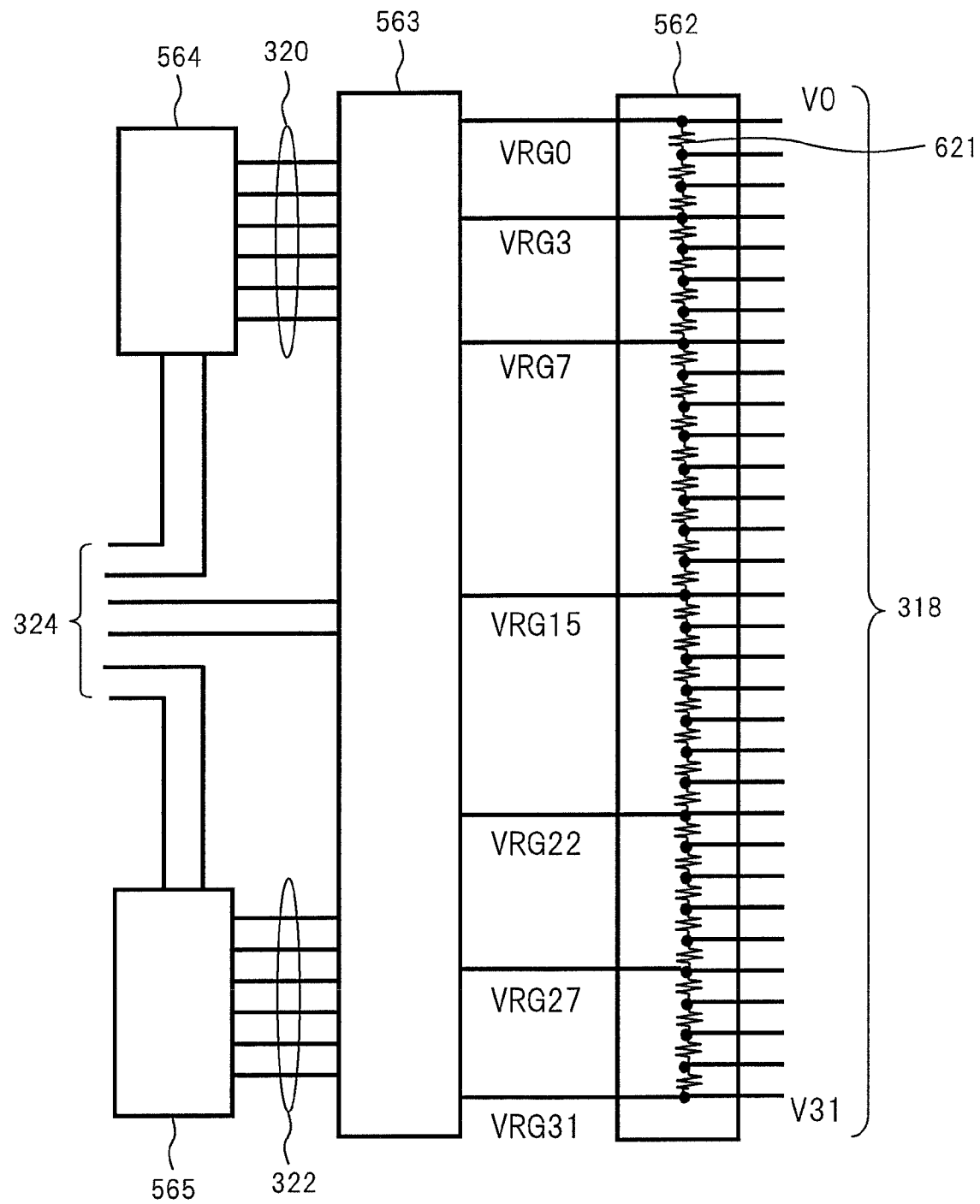
FIG. 5 is a view schematically showing the constitution of a tone voltage generation circuit of the liquid crystal drive circuit.

FIG. 5 shows the tone voltage generation circuit 562 and a gamma correction circuit 563. The gamma correction circuit 563 generates a reference tone voltage VRG such that the reference tone voltage VRG approximates a gamma function and supplies the reference tone voltage VRG to the tone voltage generation circuit 562. The tone voltage generation circuit 562 generates tone voltages by dividing the reference tone voltage VRG. By allowing the gamma correction circuit 563 to generate the reference tone voltage VRG such that the reference tone voltage VRG approximates the gamma function, it is possible to approximate the tone voltages to the gamma function.

The tone voltage generation circuit 562 is constituted of ladder resistances 621. In the tone voltage generation circuit 562, the tone voltages are generated by dividing the reference tone voltage VRG supplied from the gamma correction circuit 563 with the ladder resistances 621. In FIG. 5, for simplifying the drawing, a circuit which generates tone voltages of 32 tones from the tone voltages V0 to V31 is shown. However, it is possible to generate tone voltages of desired number of tones by providing the required number of reference tone voltages VRG and the required number of ladder resistances 621.

A low-voltage reference voltage 320 is supplied to the gamma correction circuit 563 from a low-voltage gamma correction circuit 564, and a high-voltage reference voltage 322 is supplied to the gamma correction circuit 563 from a high-voltage gamma correction circuit 565. The lines 324 are gamma value control signal lines, and a control is made such that the optimum reference tone voltage VRG is outputted from the gamma correction circuit 563 by controlling the low-voltage gamma correction circuit 564 and the high-voltage gamma correction circuit 565. The gamma value control signal line 324 is connected to the control register 575, and register values for controlling the gamma correction are set by the control register 575.

In the liquid crystal display panel 1, the AC driving which inverts polarity of the voltage applied to the liquid crystal at a predetermined cycle is performed. The AC driving is realized by alternately outputting the reference voltage to the gamma correction circuit 563 from the low-voltage gamma correction circuit 564 and the high-voltage gamma correction circuit 565 at the fixed cycle.

The tone voltages outputted from the tone voltage generation circuit 562 shown in FIG. 5 are inputted to the previously-mentioned decoder segment 526 shown in FIG. 4 through the tone voltage lines 318 and are supplied to the decoder circuit 528.

Figure 6:
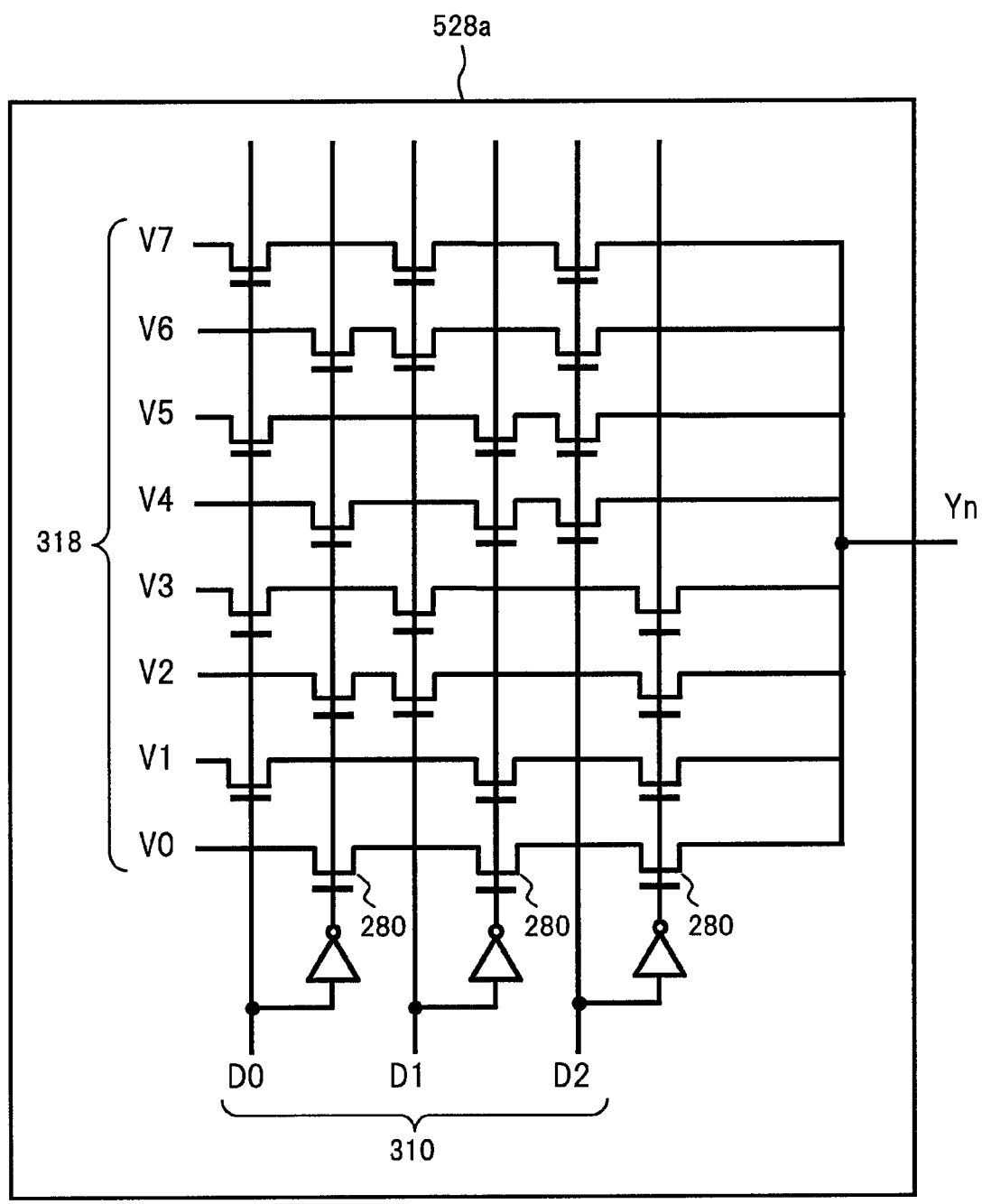
FIG. 6 is a view schematically showing the constitution of the decoder circuit of the liquid crystal drive circuit.

FIG. 6 is a schematic view for explaining the decoder circuit 528a. To simplify the drawing, the decoder circuit 528a having the constitution where 3-bit display data D0 to D2 are inputted, and one voltage is selected from eight kinds of tone voltages V0 to V7 is shown.

The tone voltages V0 to V7 are supplied to the decoder circuit 528a from the previously mentioned tone voltage generation circuit 562 via the tone voltage lines 318. The display data D0 to D2 are inputted to control terminals of the switching elements 280 provided for selecting the tone voltages V0 to V7. That is, the decoder circuit 528a shown in FIG. 6 is configured to convert the display data D0 to D2 which are formed of digital data into tone voltages V0 to V7. Hereinafter, a circuit which converts display data into tone voltages is referred to as the decoder circuit in this specification.

The display data D0 to D2 are digital data and hence, eight values can be expressed by 3 bits. The decoder circuit 528a shown in FIG. 6 is configured such that the tone voltage V0 (minimum voltage value) is selected when all 3 bits are in Low level. Next, the tone voltage V1 is selected by setting the display data D0 to D2 such that D0=1, D1=0, D2=0. Thereafter, the tone voltage to be outputted is also elevated along with the increase of the values of digital data, and the tone voltage V7 (maximum voltage value) is selected by setting the display data D0 to D2 such that D0=1, D1=1, D2=1.

The constitution of the decoder circuit 528 is not limited to the constitution shown in FIG. 6, and may be the constitution in which the tone voltage V7 is selected when all 3 bits are at a Low level. Further, although the switching elements 280 are formed of an NMOS transistor in FIG. 6, the switching elements 280 may be formed of a PMOS transistor or the combination of the PMOS transistor and the NMOS transistor.

Hereinafter, the expression of display data is simplified such that the 3-bit display data D0 to D2 are expressed as D<2:0>. Further, the display data is not limited to 3-bit data and, for example, to express upper-order 6 bits of 8-bit display data, display data is expressed as D<7:2>. Further, the display data D0=1, D1=0, D2=0 are also expressed as D(0, 0, 1).

In FIG. 6, the switching elements 280 are arranged in a matrix array, and are configured to select tone voltages using digital data. In general, when n-bit digital data (binary number) is used, values amounting to n-th power of 2 can be expressed. Accordingly, the n-bit decoder circuit can select one tone voltage from n-th power of 2 ($2^n$) pieces of tone voltages.

Further, to study the number of the switching elements in the constitution where the switching elements 280 are arranged in a matrix array as shown in FIG. 6, in case of the n-bit display data, the number of tones is $2^n$, and the switching elements the number of which corresponds to the number of data lines are needed for every tone and hence, $n \times 2^n$ pieces of switching elements 280 are needed.

Further, the condition that $n \times 2^n$ pieces of switching elements 280 are needed in case of the n-bit display data implies that the number of the switching elements 280 is doubled when the number of bits of display data is increased by 1. This implies that due to the increase of the number of displayable tones of the display device, a circuit scale is doubled every time the number of bits of the display data is increased by 1. Accordingly, the enhancement of multi-tones and the reduction of circuit scale conflict with each other.

Figure 7:
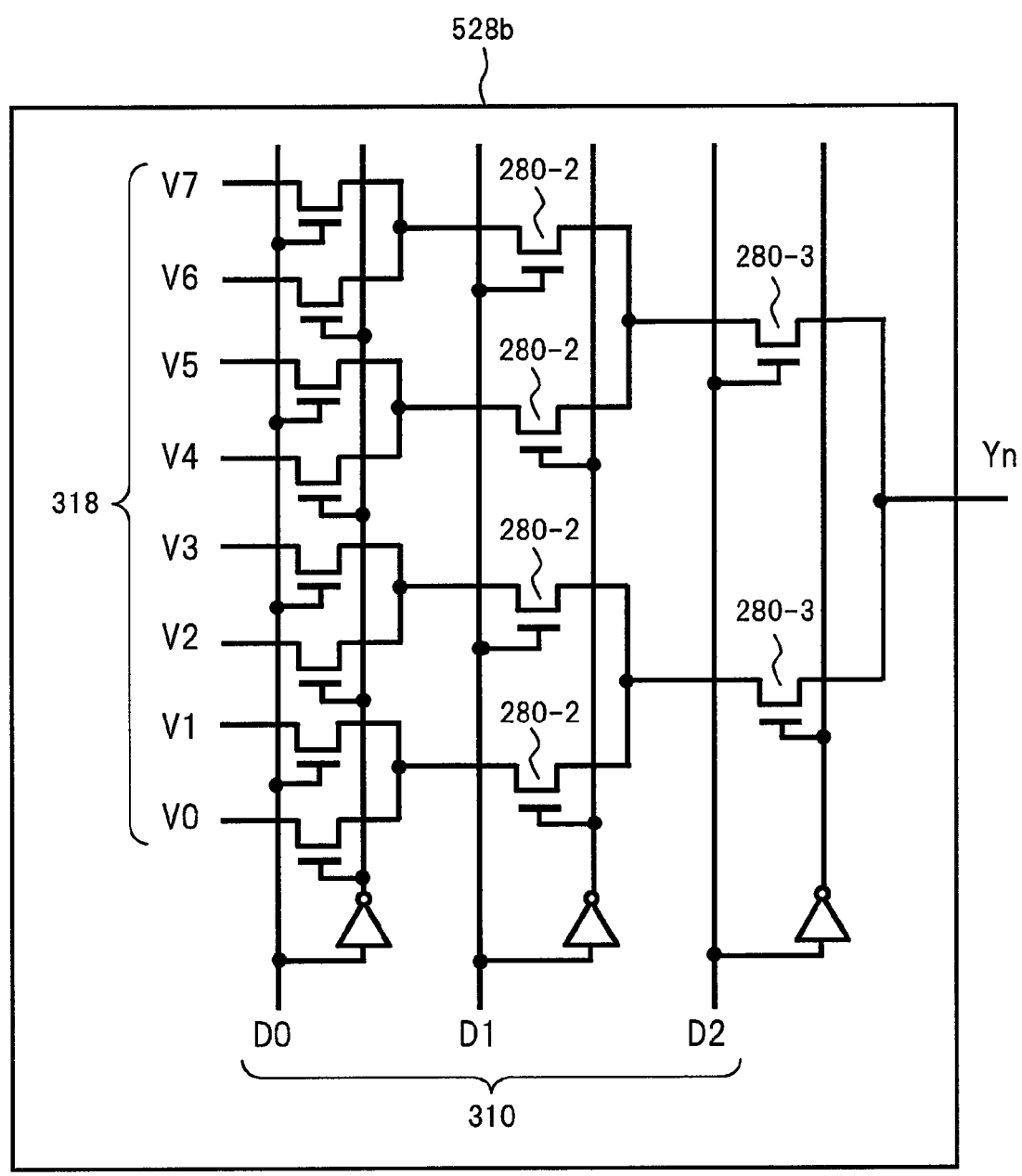
FIG. 7 is a view schematically showing the constitution of the decoder circuit of the liquid crystal drive circuit.

FIG. 7 shows the decoder circuit in which the number of switching elements is decreased compared to the circuit shown in FIG. 6. In the decoder circuit 528b shown in FIG. 7, by making use of a point that the switching elements 280-2 which are controlled based on the display data D1 are duplicated with each other, the duplicated switching elements are formed into one switching element thus omitting the duplicated switching elements. In the same manner, the switching elements 280-3 which are controlled based on the display data D2 are also duplicated with each other and hence, the duplicated switching elements are formed into one thus omitting the duplicated switching elements.

The decoder circuit 528b shown in FIG. 7 is configured such that one of two tone voltages is selected at the lower-order bits, and the result is further selected at the upper-order bits. Since the number of output voltages to be selected is halved every time the tone voltage passes the switching element, the decoder circuit 528b is referred to as a tournament-type decoder circuit. With the use of the tournament-type decoder circuit, it is possible to reduce the circuit scale.

Figure 8:
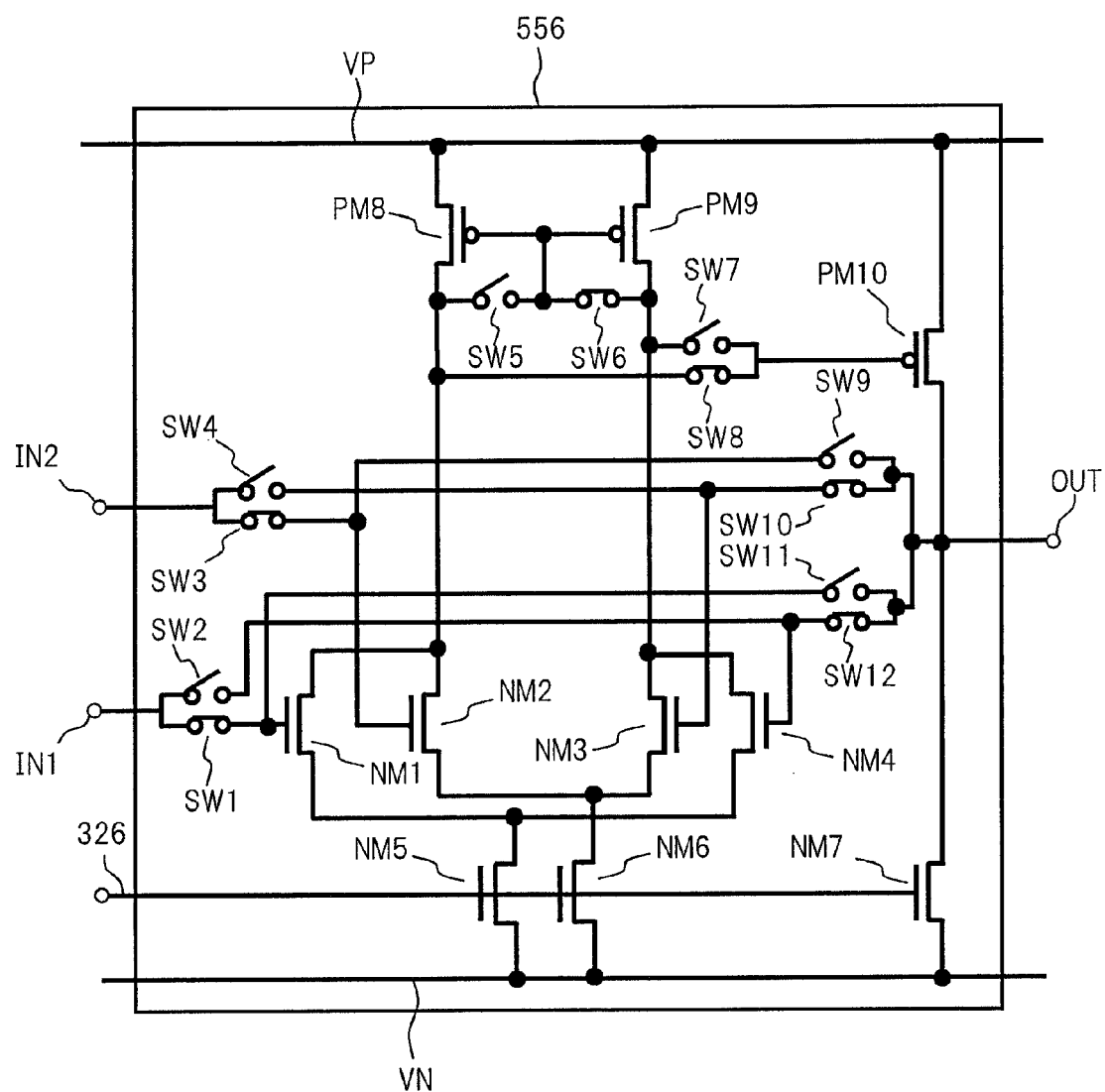
FIG. 8 is a view schematically showing the constitution of an output circuit of the liquid crystal drive circuit.

Next, FIG. 8 shows the output circuit 556 which is used for reducing the circuit scale. The output circuit 556 basically has the constitution of a voltage follower circuit. A signal is inputted to a positive-phase input terminal of a differential amplifier, and an output signal is fed back to a reversed-phase input terminal. Further, the positive-phase input terminal constitutes a 2-input differential amplifier which allows inputting of two signals.

Figure 9:
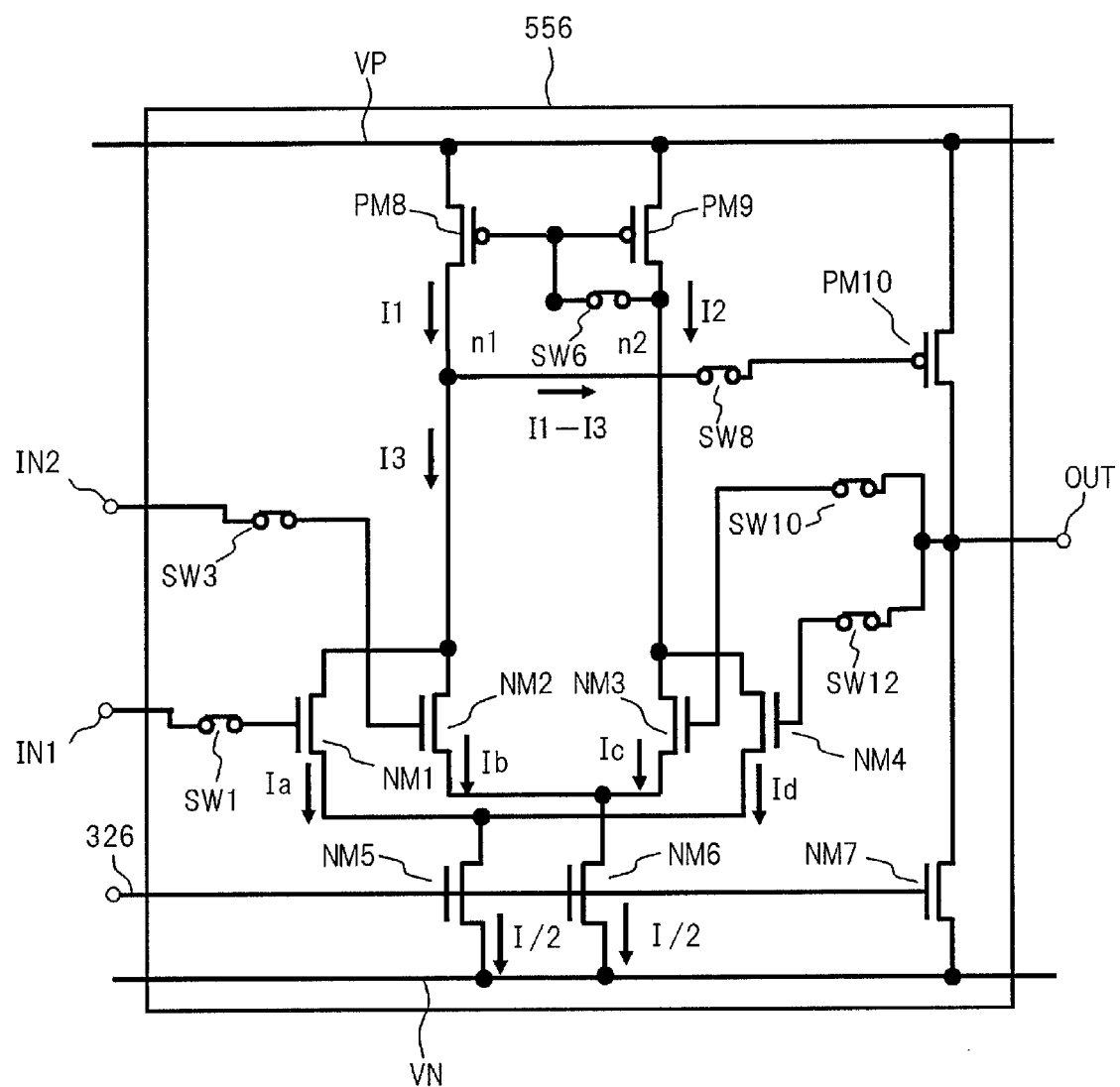
FIG. 9 is a view schematically showing the constitution of the output circuit of the liquid crystal drive circuit.

Further, the output circuit 556 includes switching elements SW1 to SW12 for canceling an offset voltage by exchanging the positive-phase input terminal and the reversed-phase input terminal. For simplifying the explanation of the output circuit 556, FIG. 9 shows the circuit where the switching elements in an OFF state are removed.

Firstly, the manner of operation of the switching elements SW1 to SW12 for canceling the offset voltage is explained in conjunction with FIG. 8. The switching elements SW1 to SW12 are configured to changeover the positive-phase input terminal and the reversed-phase input terminal.

When the switching elements SW1, SW3, SW10, SW12 are an ON state, gates of NMOS transistors NM1, NM2 constitute positive-phase input terminals, and gates of NMOS transistors NM3, NM4 constitute reversed-phase input terminals. Simultaneously, switching elements SW6, SW8 are an ON state thus setting an input of a current mirror circuit and an output of the output circuit 556. Here, the switching elements SW2, SW4, SW5, SW7, SW9, SW11 are an OFF state.

As an opposite case, when the switching elements SW2, SW4, SW5, SW7, SW9, SW11 are an ON state and the switching elements SW1, SW3, SW6, SW8, SW10, SW12 are an OFF state, the gates of the NMOS transistors NM1, NM2 constitute reversed-phase input terminals, and the gates of the NMOS transistors NM3, NM4 constitute positive-phase input terminals.

By exchanging the positive-phase input terminals and the reversed-phase input terminals, polarity of the offset voltage is inverted so that it is possible to cancel the offset voltage on average.

Next, the output circuit 556 is explained in conjunction with FIG. 9. FIG. 9 shows a case where the gates of the NMOS transistors NM1, NM2 constitute positive-phase input terminals, and the gates of the NMOS transistors NM3, NM4 constitute reversed-phase input terminals.

The output circuit 556 is a circuit referred to as a 2-input amplifier, and constitutes a 2-input differential amplifier to which signals are inputted from input terminals IN1, IN2. The basic operation of the output circuit 556 is substantially equal to an operation of a differential amplifier, wherein PMOS transistors PM8, PM9 constitute a current mirror circuit where gates of the PMOS transistors PM8, PM9 are connected to each other in common, and an electric current which flows in a node n1 and an electric current which flows in a node n2 satisfy the relationship of I1=I2.

As described previously, the output circuit 556 is formed of the voltage follower circuit, wherein an output terminal OUT is connected to gates of the NMOS transistors NM4, NM3 which constitute the reversed-phase input terminals. Accordingly, the output circuit 556 is operated in such a manner that when an electric current (I1-I3) is changed in an increased manner, an electric current which flows in a PMOS transistor PM10 is increased so that the voltages at the gates of the NMOS transistors NM3, NM4 are lowered whereby an electric current I2 is decreased so as to set the electric current (I1-I3) to 0. That is, the output circuit 556 is operated so as to maintain the relationship of I1=I2=I3.

Next, electric currents which flow in the NMOS transistors NM1, NM2, NM3, NM4 are explained. The NMOS transistor NM1 and the NMOS transistor NM4 constitute a differential pair, while the NMOS transistor NM2 and the NMOS transistor NM3 constitute a differential pair.

The input terminal IN1 is connected to the gate of the NMOS transistor NM1 so that a voltage Vin1 is applied to the gate of the NMOS transistor NM1. Further, the input terminal IN2 is connected to the gate of the NMOS transistor NM2 so that a voltage Vin2 is applied to the gate of the NMOS transistor NM2. On the other hand, the output terminal OUT is connected to the gates of the NMOS transistors NM3, NM4.

Here, assume an electric current Ids which flows between a source and a drain of the NMOS transistor NM1 as Ia, an electric current which flows in the NMOS transistors NM2 as Ib, an electric current which flows in the NMOS transistors NM3 as Ic, and an electric current which flows in the NMOS transistors NM4 as Id.

Since the electric current I3 flows in the NMOS transistor NM1 and the NMOS transistors NM2 and hence, the relationship of Ia+Ib=I3 is established, while the electric current I2 flows in the NMOS transistor NM3 and the NMOS transistors NM4 and hence, the relationship of Ic+Id=I2 is established.

Further, the NMOS transistor NM1 and the NMOS transistor NM4 are connected to the NMOS transistor NM5 which is a constant current circuit used in common by the transistors NM1, NM4 and hence, assuming an electric current which flows in the NMOS transistor NM5 as I/2, the relationship of Ia+Id=I/2 is established.

In the same manner, the NMOS transistor NM2 and the NMOS transistor NM3 are connected to the NMOS transistor NM6 which is a constant current circuit used in common by the transistors NM2, NM3 and hence, assuming an electric current which flows in the NMOS transistor NM6 as I/2, the relationship of Ib+Ic=I/2 is established.

As described previously, the output circuit 556 is operated such that the relationship of I1=I2=I3 is established and hence, the relationship of Ia+Ib=Ic+Id is established because of the relationship of Ia+Ib=I3 and the relationship of Ic+Id=I2, while the relationship of Ia+Id=Ib+Ic is established because of the relationship of Ia+Id=I/2 and the relationship of Ib+Ic=I/2. Accordingly, the relationship of Ia=Ic and the relationship of Ib=Id are established.

It is thought that by arranging the NMOS transistors NM1, NM2, NM3, NM4 close to each other and by allowing the NMOS transistors NM1, NM2, NM3, NM4 to have the same shape and the same size, the transfer conductances gm have the substantially equal values. Accordingly, the relationship between a voltage Vg which is applied to the gate of each transistor and an electric current Ids which flows between the drain and the source of each transistor is expressed as shown in FIG. 10 which is a graph.

That is, since the respective transistors are formed such that the transfer conductances gm have the substantially equal values, characteristic curves of the respective transistors exhibit the same characteristic. Since the source of the NMOS transistor NM1 and the source of the NMOS transistor NM4 are connected to each other in common, the NMOS transistors NM1, NM4 have operating points on the same characteristic curve L1, while the source of the NMOS transistor NM2 and the source of the NMOS transistor NM3 are connected to each other in common and hence, the NMOS transistors NM2, NM3 have operating points on the same characteristic curve L2.

Figure 10:
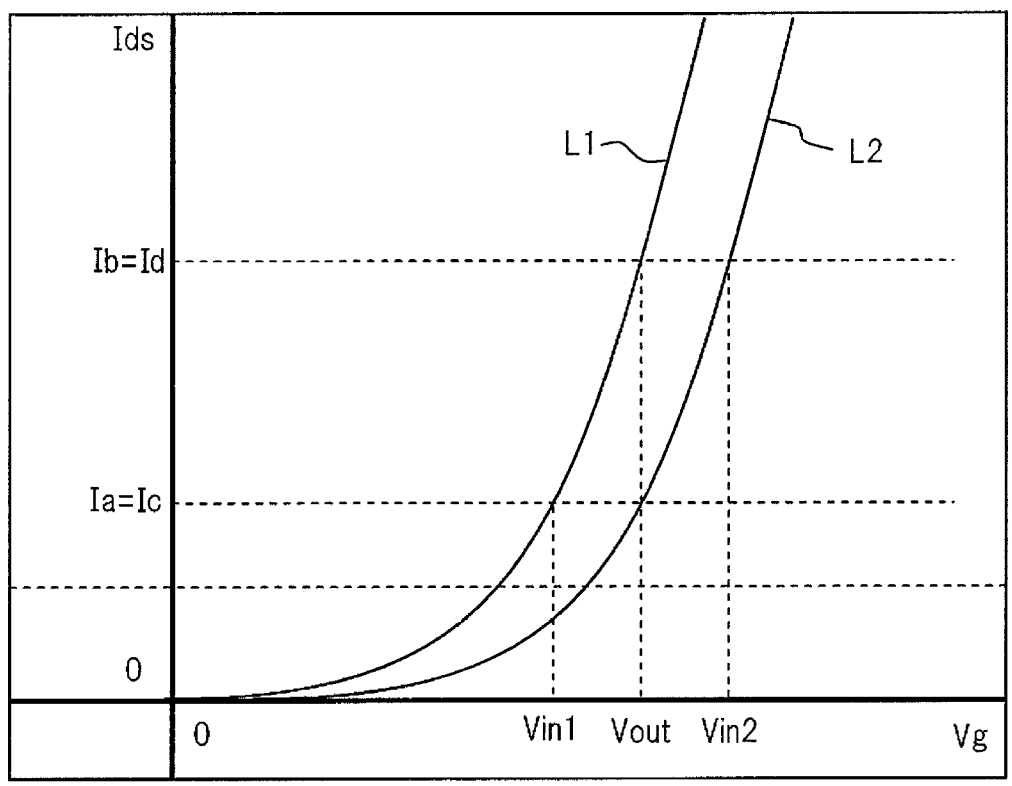
FIG. 10 is a graph showing an operational characteristic of the output circuit of the liquid crystal drive circuit.

Further, the relationship of Ia=Ic and the relationship of Ib=Id are established and a voltage Vout is applied to the gates of the NMOS transistors NM4, NM3 and hence, the characteristic curve L2 shown in FIG. 10 is a characteristic curve obtained by shifting the characteristic curve L1 laterally. That is, when the voltage Vout is applied to the gate of the NMOS transistor NM3, the source voltages of the NMOS transistors NM2, NM3 are increased such that the electric current Ids would be Ic, and the characteristic curve L2 is laterally shifted by an amount corresponding to the increase of the source voltage.

As shown in FIG. 10, an interval from the output Vout to the voltage Vin1 and an an interval from the output Vout to a voltage Vin2 are distances that the characteristic curve L2 is shifted laterally respectively. Accordingly, when the voltage Vin1 is applied to the gate of the NMOS transistor NM1 and the voltage Vin2 is applied to the gate of the NMOS transistor NM2, the output circuit 556 outputs the output Vout which is an intermediate value between the voltage Vin1 and the voltage Vin2.

In this manner, when the different voltages are applied to the input terminals IN1, IN2 of the output circuit 556, the output circuit 556 outputs the intermediate value between two inputted voltages, while when the same voltage is applied to the input terminals IN1, IN2, the output circuit 556 outputs the inputted voltage. Accordingly, with the use of the output circuit 556, it is possible to generate the intermediate voltage.

Figure 11:
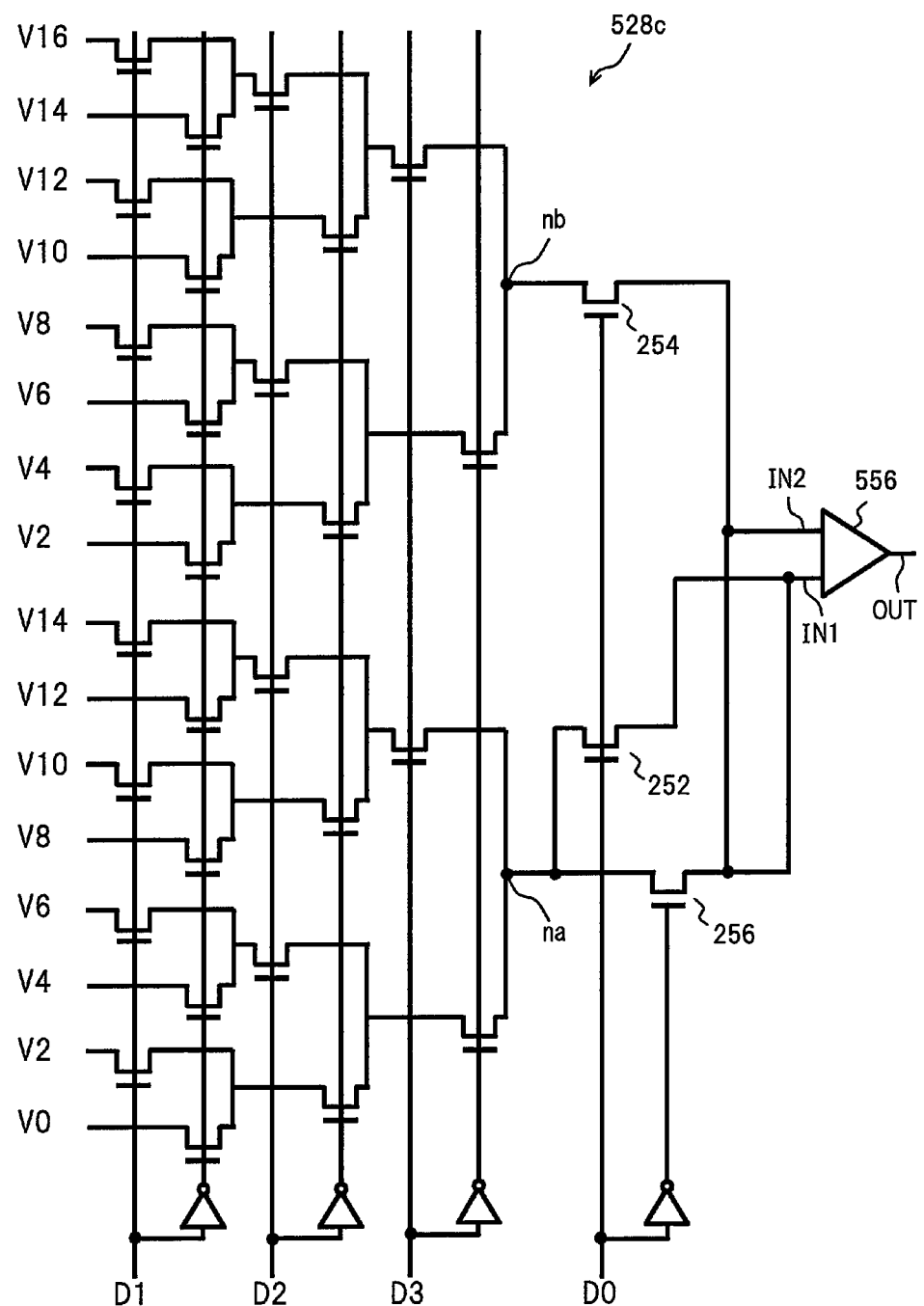
FIG. 11 is a view schematically showing the constitution of the decoder circuit of the liquid crystal drive circuit.

FIG. 11 shows a decoder circuit 528c which makes use of the output circuit 556. As described previously, the output circuit 556 outputs the input voltage when the input voltages have the same value, and outputs the intermediate voltage when the input voltages are different from each other. Accordingly, by providing eight different voltages consisting of V0, V2, V4, V6, V8, V10, V12 and V14 out of voltages V0 to V14 as shown in FIG. 11, with the use of the output circuit 556, it is possible to output fifteen kinds of voltages ranging from V0 to V14.

For example, in outputting the voltage V0, the voltage V0 is outputted from a node na when values of display data D<3:0> are set such that D1=0, D2=0, D3=0, and the switching element 256 becomes an ON state when display data D0 is set to 0. Then, the voltage V0 is supplied to both input terminals IN1 and IN2, and the voltage V0 is outputted from the output OUT.

Next, to output the voltage V1 which is the intermediate voltage between the voltages V0 and V2, the voltage V0 is outputted from the node na and the voltage V2 is outputted from a node nb when values of display data D<3:0> are set such that D1=0, D2=0, D3=0, and the switching elements 252, 254 are an ON state when display data D0 is set to 1 so that the voltage V0 is supplied to the input terminal IN1, and the voltage V2 is supplied to the input terminal IN2 whereby the intermediate voltage V1 is outputted from the output OUT.

In this manner, with the use of the output circuit 556, it is possible to halve the number of voltages to be prepared so that the circuit scale can be reduced. However, the above-mentioned constitution is not effective in the reduction of the circuit scale of the decoder circuit 528c.

Figure 12:
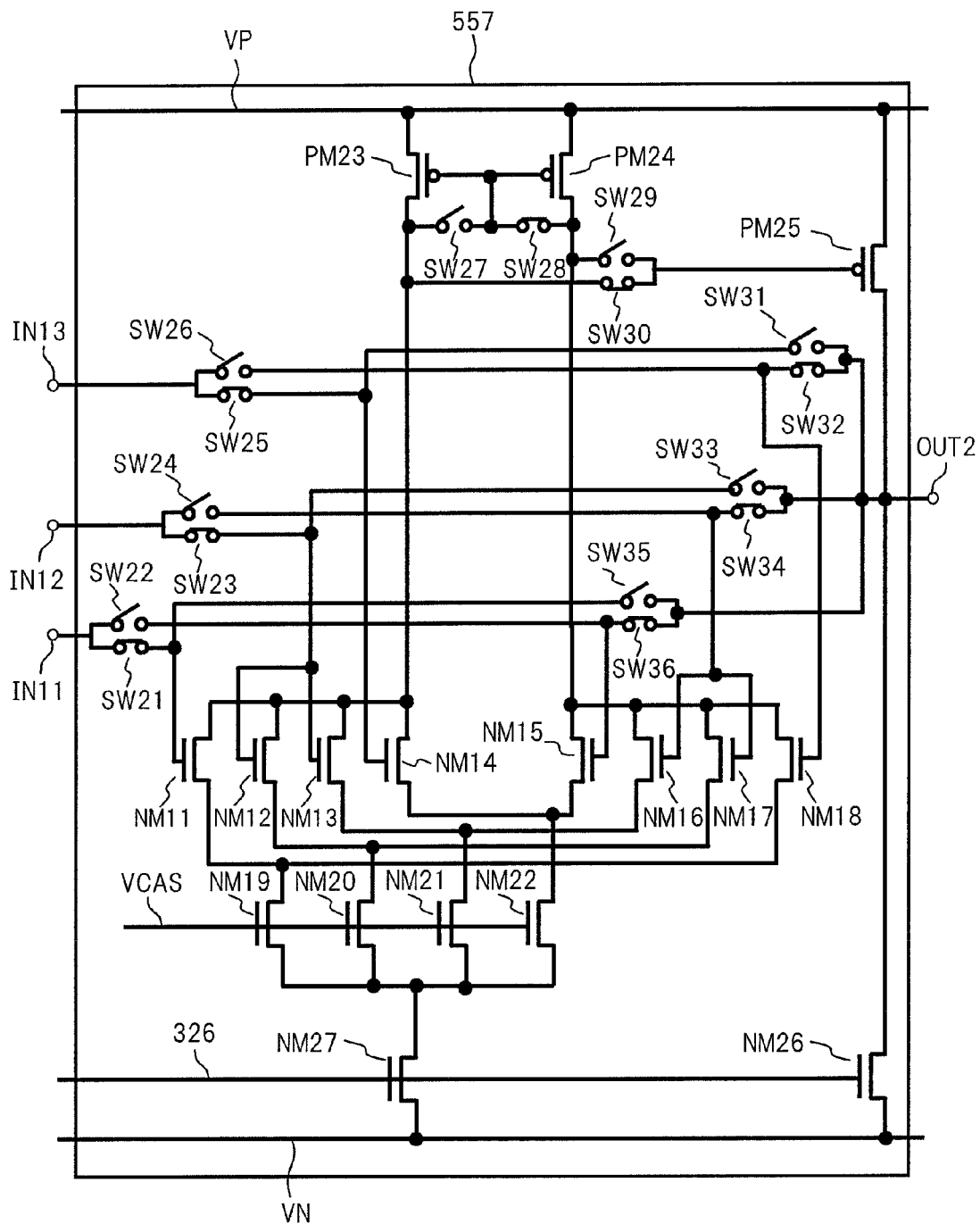
FIG. 12 is a view schematically showing the constitution of an output circuit of the liquid crystal drive circuit.

Accordingly, this embodiment uses a 3-input and 5-value output circuit 557 shown in FIG. 12. As shown in FIG. 12, switching elements SW21 to SW36 are provided for canceling the offset voltage by exchanging a positive-phase input terminal and a reversed-phase input terminal thereof. Hereinafter, the explanation is made with respect to a case where the switching elements SW21, SW23, SW25, SW28, SW30, SW32, SW34, SW36 are an ON state.

An input of the output circuit 557 is constituted of three terminals consisting of input terminals IN11, IN12, IN13, wherein the input terminal IN11 is connected to a gate of the NMOS transistor NM11, the input terminal IN12 is connected to gates of the NMOS transistors NM12, NM13, and the input terminal IN13 is connected to a gate of the NMOS transistor NM14.

The NMOS transistor NM11 and the NMOS transistor NM18 constitute a differential pair, the NMOS transistor NM12 and the NMOS transistor NM17 constitute a differential pair, the NMOS transistor NM13 and the NMOS transistor NM16 constitute a differential pair, and the NMOS transistor NM14 and the NMOS transistor NM15 constitute a differential pair.

Further, a constant current circuit is constituted of a constant current source transistor NM27 having a gate to which a predetermined voltage is applied via a voltage line 326, and current distribution transistors NM19, NM20, NM21, NM22 which are connected to a drain of the constant current source transistor NM27 by cascode connection.

The constant current source transistor NM27 is configured to allow an electric current having a fixed value to accurately flow therethrough, and the current distribution transistors NM19, NM20, NM21, NM22 are arranged close to each other, are formed to have the same shape and size so as to exhibit equal characteristics whereby an electric current uniformly flows in the respective differential pairs.

The constant current circuit may be constituted of four constant current source transistors. However, by forming the constant current circuit using the constant current source transistor NM27 and the current distribution transistors NM19, NM20, NM21, NM22, it is unnecessary to divide the constant current source transistor. Accordingly, particularly, the constitution which provides the current distribution transistors is effective in the case that it is difficult to divide the constant current source transistors because of increasing the number of differential pairs.

The output circuit 557 basically has the constitution where the above-mentioned output circuit 556 having 2 inputs is transformed into an output circuit having 4 inputs, wherein the input terminal IN12 is connected to gates of the NMOS transistors NM12, NM13 in common.

Accordingly, a voltage VOUT2 which is outputted to the output OUT2 of the output circuit 557 becomes a voltage which is expressed by VOUT2=(VIN11+VIN12+VIN12+VIN13)/4. That is, the voltage VOUT2 becomes the voltage expressed by VOUT2=(VIN11+(2×VIN12)+VIN13)/4 so that the voltage VOUT2 becomes an output where the input of the input terminal IN12 is weighted twofold.

Accordingly, when voltages VA, VB are set to satisfy the relationship of VB=5×VA, as shown in FIG. 13, voltages having values which are obtained by multiplying the voltage VA by 1 to 5 times can be outputted from the output VOUT2. However, a selection circuit which selects voltages inputted to the respective input terminals IN11, IN12, IN13 in accordance with a table shown in FIG. 13 is needed.

Figure 14:
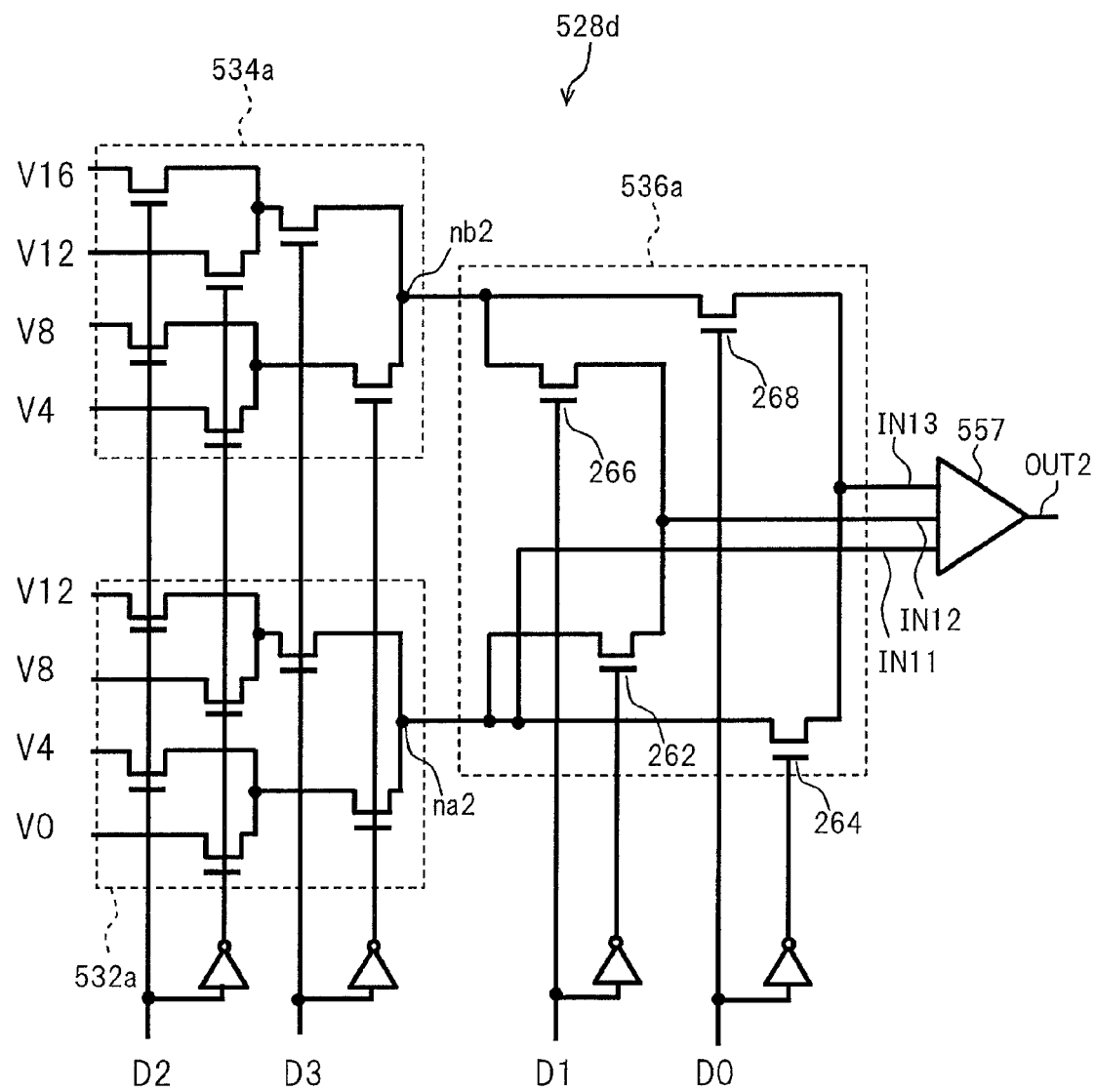
FIG. 14 is a view schematically showing the constitution of the decoder circuit of the liquid crystal drive circuit.

FIG. 14 shows a decoder circuit 528d when the 3-input and 5-value output circuit 557 is used. The decoder circuit 528d includes a first decoder circuit 532a, a second decoder circuit 534a, a selection circuit 536a and the output circuit 557.

Further, FIG. 15 shows a truth table which expresses voltages inputted to the input terminals IN11 to IN13 based on values of display data D0 and D1. Here, symbol VA indicates a voltage outputted to a node na2 from the first decoder circuit 532a, and symbol VB indicates a voltage outputted to a node nb2 from the second decoder circuit 534a.

In the selection circuit 536a shown in FIG. 14, when display data D0, D1 are set such that D0=0, D1=0, switching elements 262, 264 become an ON state, and switching elements 266, 268 become an OFF state. Accordingly, the voltage VA is inputted to the input terminals IN11, IN12, IN13.

Next, when the display data D0, D1 are set such that D0=1, D1=0, the switching elements 262, 268 become an ON state, and the switching elements 264, 266 become an OFF state. Accordingly, the voltage VA is inputted to the input terminals IN11, IN12, and the voltage VB is inputted to the input terminal IN13.

Then, when the display data D0, D1 are set such that D0=0, D1=1, the switching elements 266, 264 become an ON state, and the switching elements 262, 268 become an OFF state. Accordingly, the voltage VA is inputted to the input terminal IN12, and the voltage VB is inputted to the input terminals IN11, IN13.

Then, when the display data D0, D1 are set such that D0=1, D1=1, the switching elements 266, 268 become an ON state, and the switching elements 262, 264 become an OFF state. Accordingly, the voltage VA is inputted to the input terminal IN11, and the voltage VB is inputted to the input terminals IN12, IN13.

In this manner, in a state where the voltage VA is outputted from the first decoder circuit 532a, the voltage VB is outputted from the second decoder circuit 534a, the voltage VB is set to satisfy the relationship of VB=5×VA, and the selection circuit 536a is provided, with the use of the 3-input and 5-value output circuit 557, the output VOUT2 can take five values which are obtained by multiplying the voltage VA by 1 to 5 times as shown in the table in FIG. 13.

Further, outputs from the first decoder circuit 532a and the second decoder circuit 534a take values expressed in a truth table shown in FIG. 16. When display data D2, D3 are set such that D2=0, D3=0, the voltage V0 is outputted to the node na2 and the voltage V4 is outputted to the node nb2. When the display data D2, D3 are set such that D2=1, D3=0, the voltage V4 is outputted to the node na2 and the voltage V8 is outputted to the node nb2. Further, when the display data D2, D3 are set such that D2=1, D3=1, the voltage V12 is outputted to the node na2 and the voltage V16 is outputted to the node nb2.

Accordingly, with the use of the decoder circuit 528d shown in FIG. 14, two voltage values are selected from five voltage values at upper-order 2 bits out of 4-bit display data, and two voltage values are inputted to three input terminals of the 3-input and 5-value output circuit 557 using the selection circuit 536a at lower-order 2 bits and hence, it is possible to obtain the voltage capable of taking five values generated between two voltage values.

Accordingly, as shown in FIG. 17, based on voltage values V0, V4, V8, V12, V16 (V4=5×V0, V8=9×V0, V12=13×V0, V16=17×V0 in the drawing), it is possible to obtain voltage values from the voltage value V0 to a voltage value which is 17 times as large as the voltage value V0. That is, the decoder circuit 528d shown in FIG. 14 can obtain 17 voltage values from 5 voltage values by using the output circuit 557 with respect to the display data of lower-order 2 bits thus realizing the reduction of the circuit scale.

Here, to focus on the voltage value V8 in the truth table shown in FIG. 16, the voltage value V8 is outputted to the node na2 as the voltage VA when the display data D2, D3 are set such that D2=0, D3=1, and is outputted to the node nb2 as the voltage VB when the display data D2, D3 are set such that D2=1, D3=0.

Figures 18, 19:
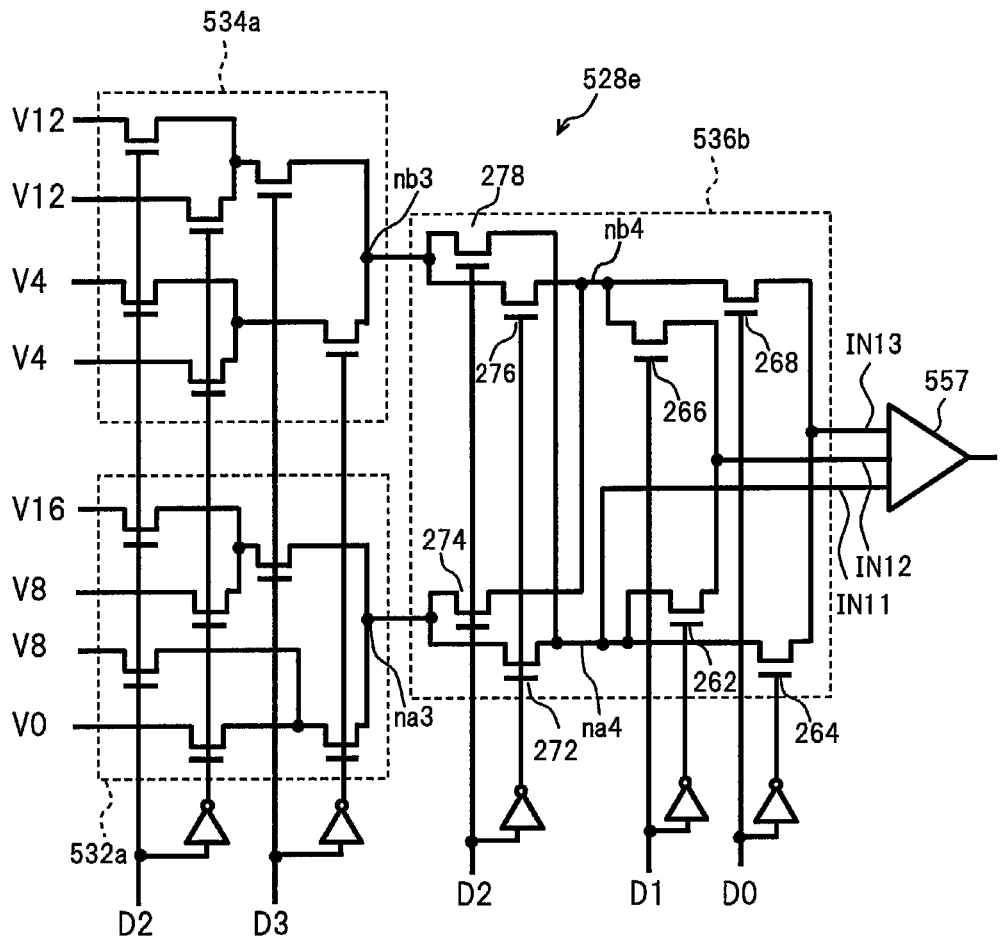
FIG. 18 is a view schematically showing the constitution of the decoder circuit of the liquid crystal drive circuit.
FIG. 19 is a table of truth value showing an output of the decoder circuit of the liquid crystal drive circuit.

Accordingly, by exchanging the connection of the node na2 and the node nb2, it is possible to omit the circuit which selects the voltage from voltages which are outputted doubled. FIG. 18 shows a selection circuit 536b in which the node na2 and the node nb2 are exchanged. Further, a truth table of the circuit shown in FIG. 18 is shown in FIG. 19.

In a decoder circuit 528e shown in FIG. 18, a voltage V0 is outputted to a node na3 and a voltage V4 is outputted to a node nb3 when the display data D2, D3 are set such that D2=0, D3=0. Since the display data D2 is set to 0 at this point of time, switching elements 272, 276 are an ON state and switching elements 274, 278 are an OFF state so that the voltage V0 is outputted to the node na4, and the voltage V4 is outputted to the node nb4.

Next, the voltage V8 is outputted to the node na3 and the voltage V4 is outputted to the node nb3 when the display data D2, D3 are set such that D2=1, D3=0. Since the display data D2 is set to 1 at this point of time, switching elements 272, 276 are an OFF state and switching elements 274, 278 are an ON state so that the voltage V4 is outputted to the node na4, and the voltage V8 is outputted to the node nb4.

In the same manner, hereinafter, the voltage V8 is outputted to a node na4 and the voltage V12 is outputted to a node nb4 when the display data D2, D3 are set such that D2=0, D3=1, and the voltage V8 is outputted to the node na4 and a voltage V12 is outputted to a node nb4 when the display data D2, D3 are set such that D2=1, D3=1.

In this manner, with the use of the selection circuit 536b shown in FIG. 18, it is possible to omit the duplicated voltage so that a line which supplies the duplicated voltage can be omitted thus realizing the reduction of the circuit scale.

Figure 20:
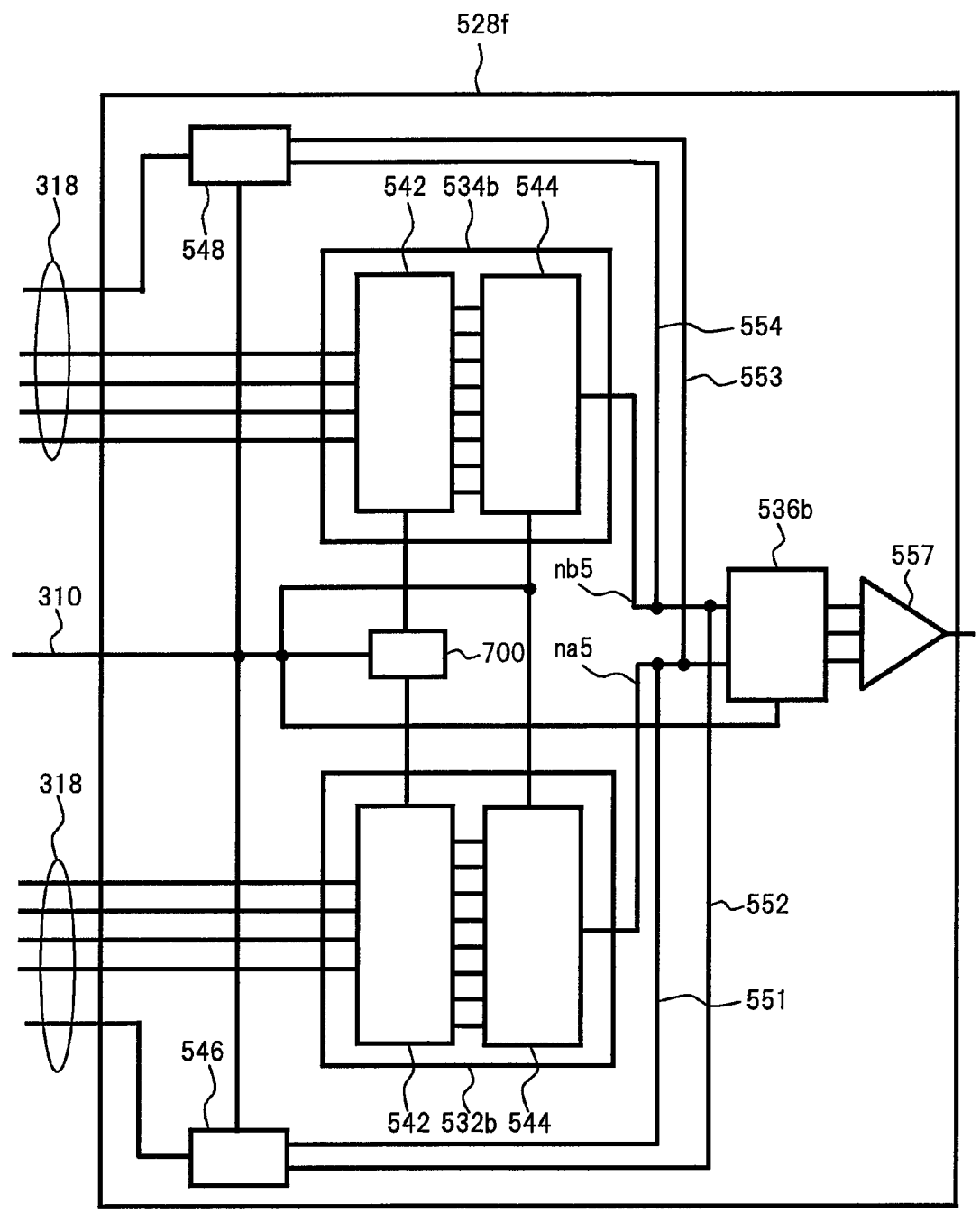
FIG. 20 is a view schematically showing the constitution of the decoder circuit of the liquid crystal drive circuit.

FIG. 20 is a block diagram showing a decoder circuit 528f whose circuit scale is further reduced. The decoder circuit 528f shown in FIG. 20 is divided into a first decoder circuit 532b and a second decoder circuit 534b, and each of the first decoder circuit 532b and the second decoder circuit 534b is divided into a select-switch-type decoder circuit 542 and a tournament-type decoder circuit 544. Further, a decoder circuit 528f is additionally provided with a low-voltage-side decoder circuit 548 and a high-voltage-side decoder circuit 546.

Here, in the decoder circuit 528f shown in FIG. 20, the explanation is made by taking a case where voltages of 256 tones are selected from 8-bit display data as an example. Voltages corresponding to lower-order 2 bits of 8 bits are generated using the selection circuit 536b and the 3-input and 5-value output circuit 557 described previously. Accordingly, a signal of D<1:0> amounting to lower-order 2 bits of the display data line 310 is inputted to the selection circuit 536b. Further, the display data D2 of the third bit counted from a lowermost-order position is inputted to the selection circuit 536b for an operation which exchanges the above-mentioned nodes.

The tone voltage lines 318 are connected to the first decoder circuit 532b. The first decoder circuit 532b selects one voltage from voltages supplied through the tone voltage lines 318 and outputs the selected voltage to a node nay. The tone voltage lines 318 are also connected to the second decoder circuit 534b. The second decoder circuit 534b also selects one voltage from voltages supplied through the tone voltage lines 318 and outputs the selected voltage to the node nb5.

The select-switch-type decoder circuit 542 in the first decoder circuit 532b and the second decoder circuit 534b respectively selects one voltage from voltages supplied through the tone voltage lines 318 using data D<4:2> ranging from the third bit counted from the lowermost-order position of the display data to the fifth bit counted from the lowermost-order position of the display data, and outputs the selected voltage to the tournament-type decoder circuit 544.

The tournament-type decoder circuit 544 selects one voltage from voltages which the select-switch-type decoder circuit 542 outputs using data D<7:5> of the upper-order 3 bits, and outputs the selected voltage to the selection circuit 536b.

Figure 21:
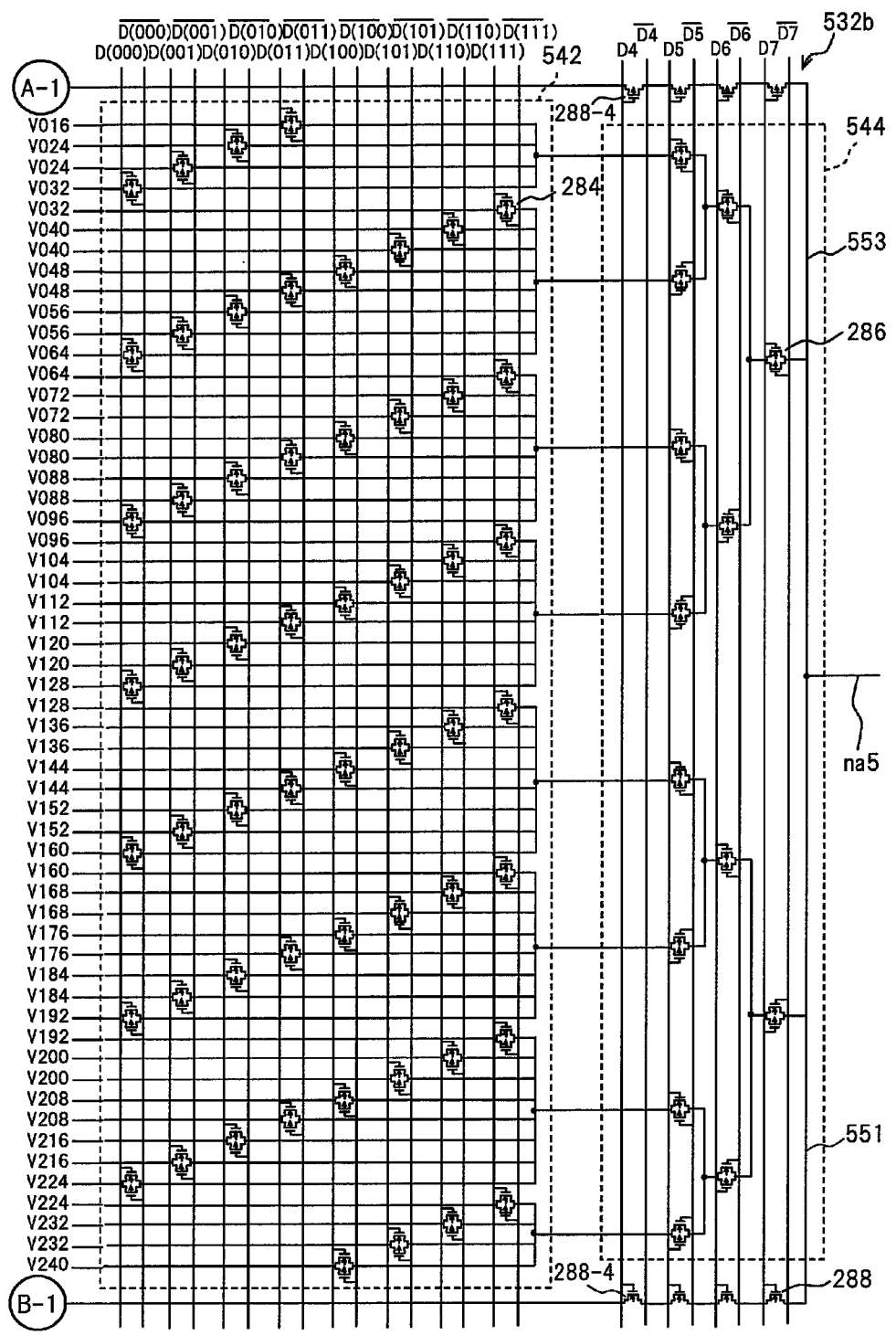
FIG. 21 is a view schematically showing the constitution of the decoder circuit of the liquid crystal drive circuit.

FIG. 21 shows the constitution of the select-switch-type decoder circuit 542 and the tournament-type decoder circuit 544 by taking the first decoder circuit 532b as an example. The decoder circuit 528f is explained hereinafter with respect to a case where a tone voltage V255 is outputted when the display data D (0, 0, 0, 0, 0, 0, 0, 0) is supplied, and a tone voltage V0 is outputted when the display data D (1, 1, 1, 1, 1, 1, 1, 1) is supplied.

In the select-switch-type decoder circuit 542, selection signals D(000) to D(111) which are outputted from an additionally provided data selector circuit 700 are inputted to control terminals of switching elements 284. The switching element 284 is brought into an ON state in response to a selection signal outputted from the data selector circuit 700 so that one voltage is selected out of the tone voltages V016 to V240 and the selected voltage is outputted to the tournament-type decoder circuit 544.

While the tournament-type decoder circuit 544 has the substantially same constitution as the decoder circuit 528b shown in FIG. 7, the tournament-type decoder circuit 544 selects one voltage out of 8 kinds of voltages outputted from the select-switch-type decoder circuit 542 based on D<7:5> of 3 bits, and outputs the selected voltage to the node na5.

The switching element 288 constitutes a part of a lower-voltage-side decoder circuit 548 and a part of a high-voltage-side decoder circuit 546, and outputs an output of the lower-voltage-side decoder circuit 548 to the node na5 when all display data D<7:4> are "0". Further, the switching element 288 outputs an output of the high-voltage-side decoder circuit 546 to the node na5 when all display data D<7:4> are "1".

Figure 22:
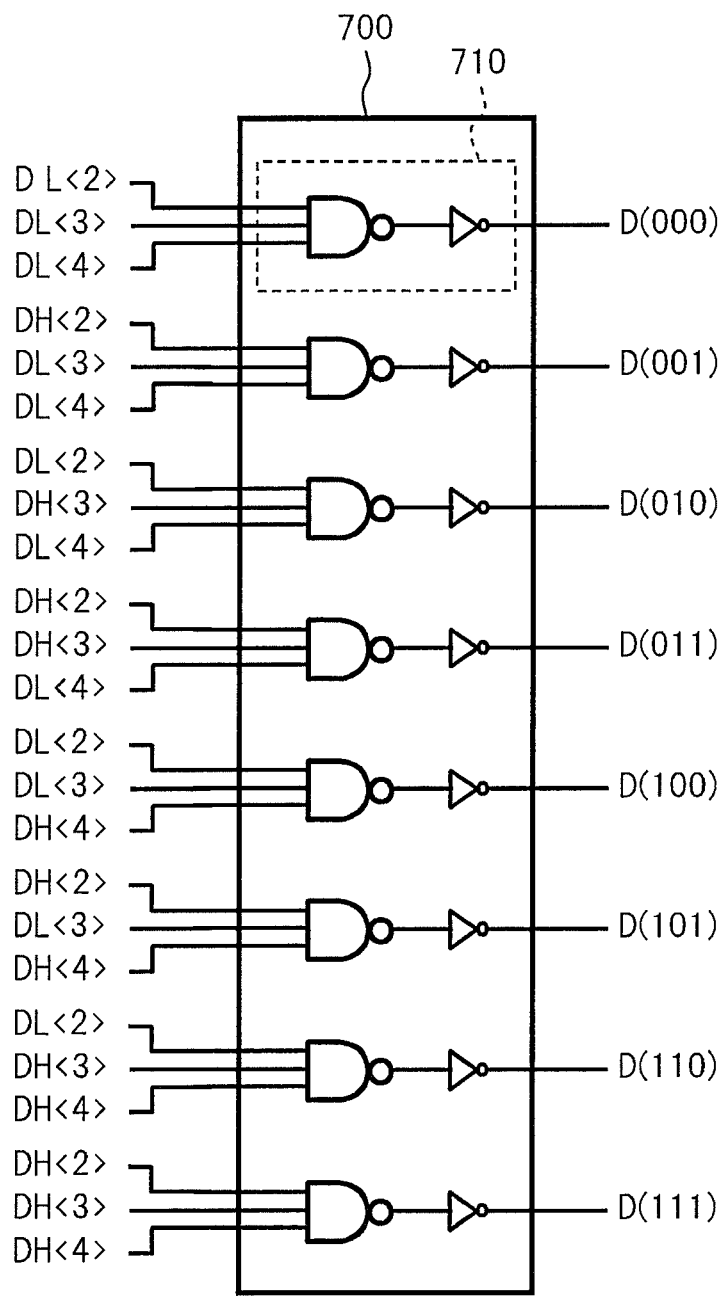
FIG. 22 is a view schematically showing the constitution of a data selector circuit of the liquid crystal drive circuit.
Figure 23:
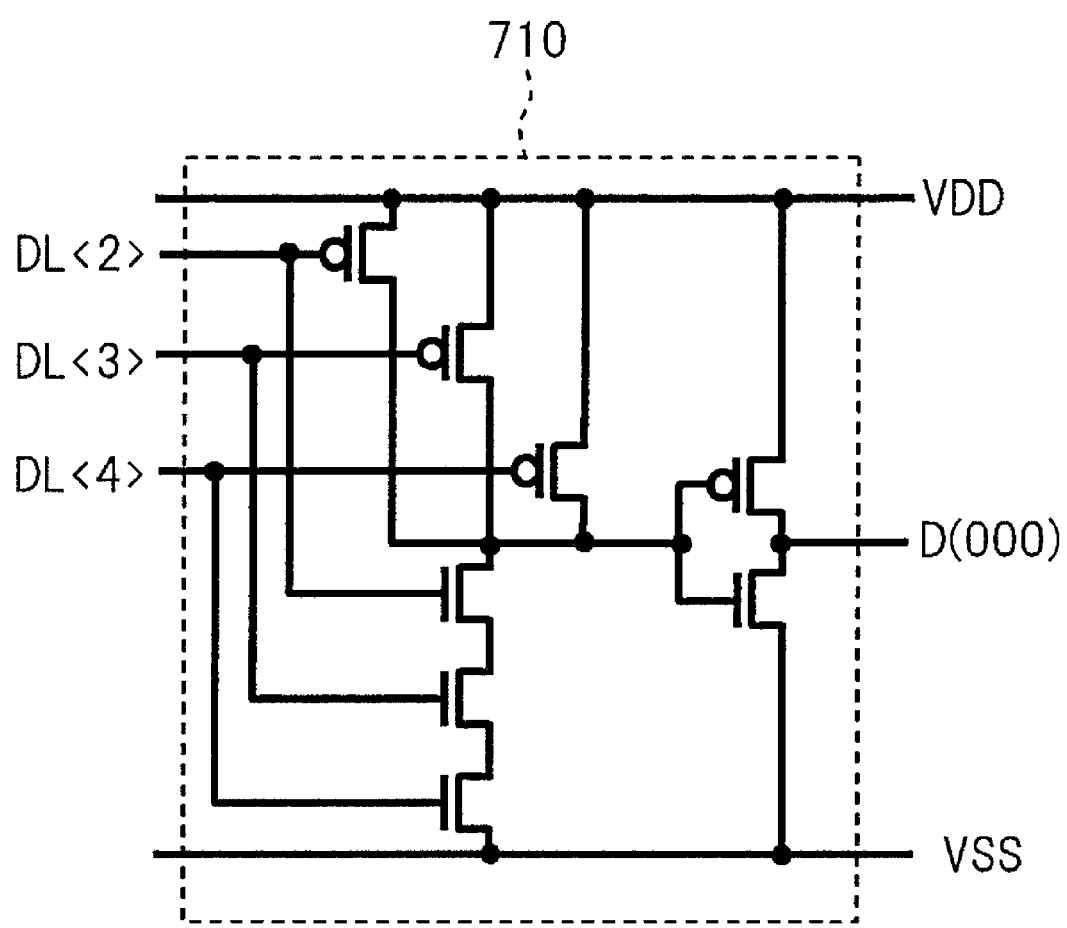
FIG. 23 is a view schematically showing the constitution of a data selector circuit of the liquid crystal drive circuit.

FIG. 22 shows a data selector circuit 700. The data selector circuit 700 outputs a select signal for controlling ON/OFF of a transistor switch based on a tone value D<4:2> of 3 bits. Further, FIG. 23 shows one of the data multiplexer circuits 710 which constitute the data selector circuit 700, and each data multiplexer circuit 710 is formed of the combination of a NAND circuit and an inverter circuit. As shown in FIG. 22 and FIG. 23, the data selector circuit 700 is formed of 8 pieces of combinations each of which consists of the NAND circuit constituted of 8 pieces of transistors and the inverter circuit. Accordingly, the data selector circuit 700 is constituted of 64 pieces of transistors.

Here, to study the number of switching elements necessary for the select-switch-type decoder circuit 542, the number of tone voltages selected by the select-switch-type decoder circuit 542 is 56 and hence, provided that one switching element is provided for every tone, 56 pieces of switching elements which select the tone voltages are needed and hence, the 120 pieces of switching elements including the above-mentioned 64 pieces of switching elements of the data selector circuit 700 are needed.

To the contrary, when the decoder circuit is formed of the tournament-type decoder circuits, 7 pieces of decoder circuits 528b which select 8 voltages based on 3-bit display data shown in FIG. 7 are needed. Since 14 pieces of switching elements are needed in one decoder circuit 528b, 98 pieces of switching elements in total are needed.

Figure 24:
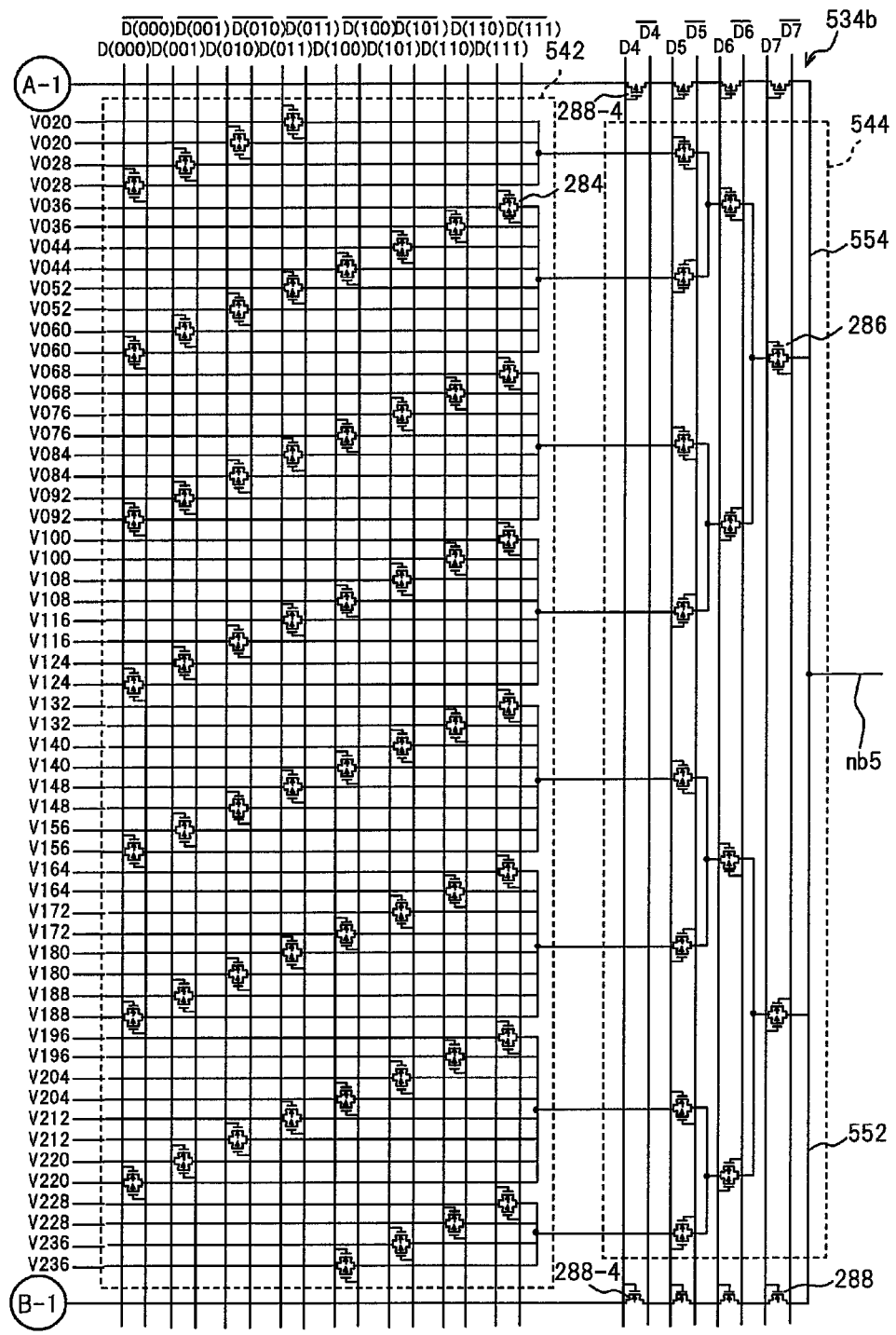
FIG. 24 is a view schematically showing the constitution of the decoder circuit of the liquid crystal drive circuit.
Figure 25:
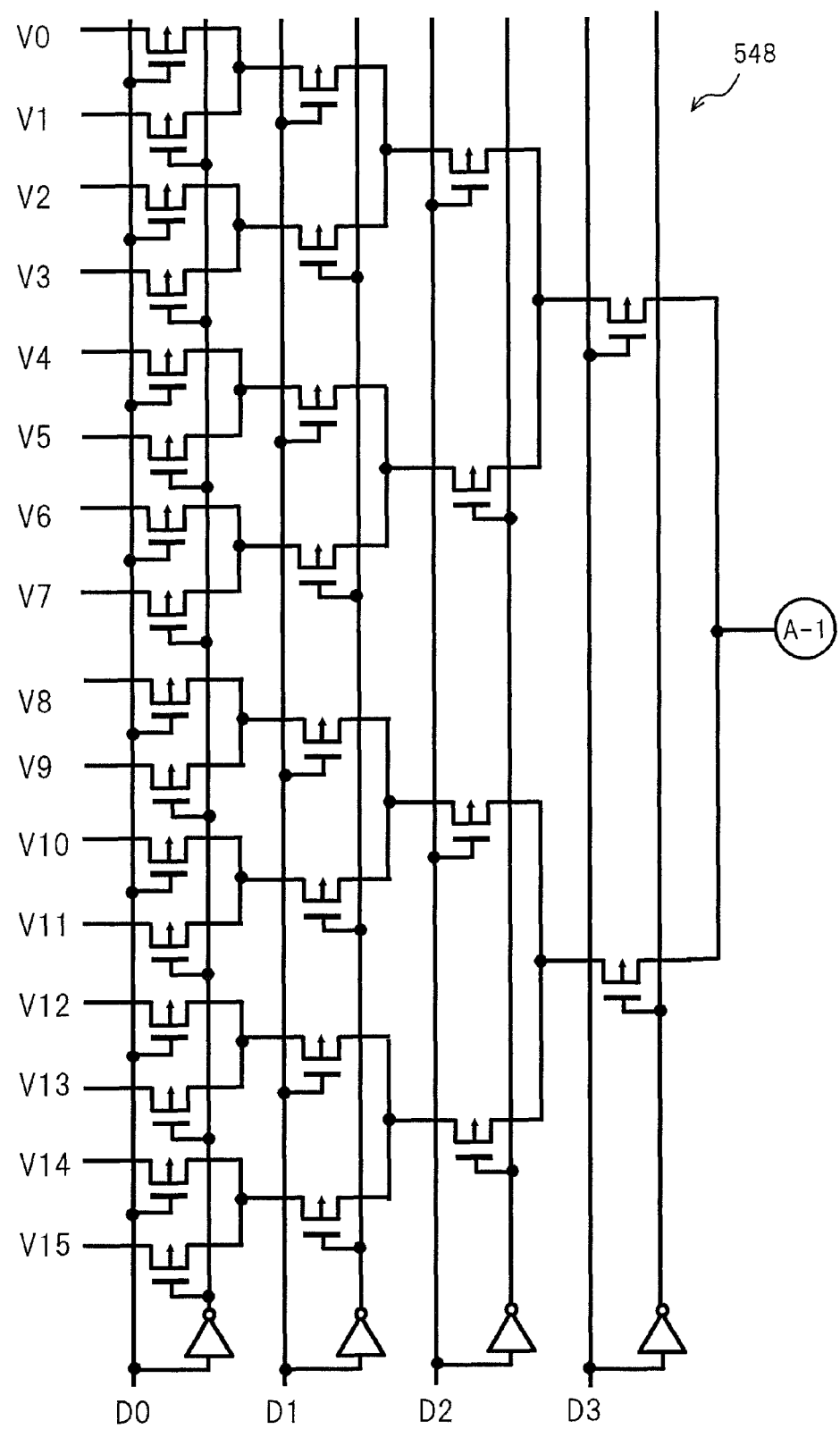
FIG. 25 is a view schematically showing the constitution of the decoder circuit of the liquid crystal drive circuit.
Figure 26:
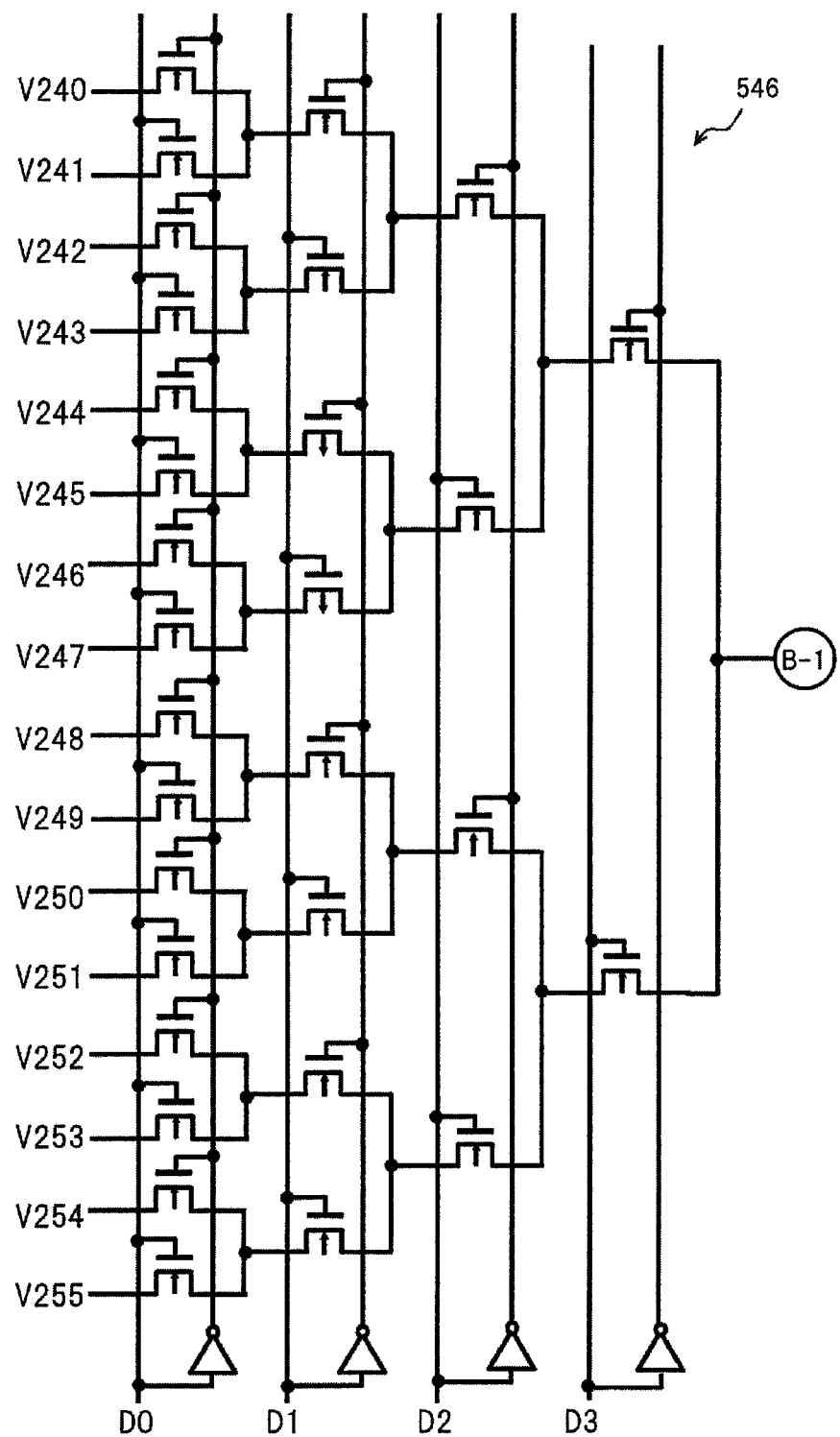
FIG. 26 is a view schematically showing the constitution of the decoder circuit of the liquid crystal drive circuit.

FIG. 24 shows the second decoder circuit 534b. FIG. 25 shows the low-voltage-side decoder circuit 548. FIG. 26 shows the high-voltage-side decoder circuit 546. An output A-1 of the low-voltage-side decoder circuit 548 is connected to both of an output A-1 of the first decoder circuit 532b shown in FIG. 21 and an output A-1 of the second decoder circuit 534b shown in FIG. 24. Further, an output B-1 of the high-voltage-side decoder circuit 546 is connected to both of an output B-1 of the first decoder circuit 532b shown in FIG. 21 and an output B-1 of the second decoder circuit 534b shown in FIG. 24.

The reason that the low-voltage-side decoder circuit 548 and the high-voltage-side decoder circuit 546 are provided separately is that a voltage is not changed in a straight line on a low voltage side and a high voltage side of the tone voltages and hence, the 3-input and 5-value output circuit 557 where an output is changed at a rate of 1:1 cannot be used.

Further, as shown in FIG. 17, to output 18 pieces of tone voltages, it is necessary to supply the voltage V16 to three input terminals IN11, IN12, IN13 of the output circuit 557. In the decoder circuit 528e shown in FIG. 18, there arises a following drawback. That is, when display data D0 to D3 are set such that D0=1, D1=1, D2=1, D3=1, since display data D2 is set to 1 and display data D3 is set to 1, the voltage V16 is outputted to a node na3, and the voltage V12 is outputted a node nb3. Since display data D2 is set such that D2=1, the voltage V12 is outputted to a node na4, and the voltage V16 is outputted to a node nb4. Since display data D1 and D0 are set such that display data D1=1, D0=0, the voltage V12 is inputted to the input terminal IN11, the voltage V16 is inputted to the input terminal IN12, and the voltage V16 is inputted to the input terminal IN13.

That is, there is the drawback that an output at the node na3 cannot be outputted to the node na4 when the display data D2 is set such that D2=1. Accordingly, when the display data is D (1, 1, 1, 1, 0, 0, 0, 0), the second decoder circuit 534b outputs the voltage V240 from the high-voltage-side decoder circuit 546, and supplies the voltage V240 to three input terminals IN11, IN12, IN13 of the output circuit 557.

Although the low-voltage-side decoder circuit 548 and the high-voltage-side decoder circuit 546 are connected in common to three input terminals IN11, IN12, IN13 of the output circuit 557, these circuits are configured such that the output A-1 of the low-voltage-side decoder circuit 548 and the output B-1 of the high-voltage-side decoder circuit 546 are made conductive with the input terminals IN11, IN12, IN13 based on a value of the display data D4 using the switching element 288-4.

In a decoder circuit 528f shown in FIG. 20, the data selector circuit 700, the low-voltage-side decoder circuit 548 and the high-voltage-side decoder circuit 546 described previously are used in common by the first decoder circuit 532b and the second decoder circuit 534b. Accordingly, circuits which are used in common for the first decoder circuit 532b and the second decoder circuit 534b necessary for the 3-input and 5-value output circuit 557 can be collectively formed into one circuit thus realizing the reduction of the circuit scale.

By using the low-voltage-side decoder circuit 548 and the high-voltage-side decoder circuit 546 in common, there is possibility of short-circuiting between input terminals of the selection circuit 536b. By controlling the connection between the output A-1 and the output B-1 using switching elements 288 shown in FIG. 21 and FIG. 24, timing at which voltages are outputted to lines 551, 552 from the low-voltage-side decoder circuit 548 and timing at which voltages are outputted to lines 551, 552 from the high-voltage-side decoder circuit 546 are controlled.

Accordingly, 16 pieces of switching elements 288 in total which are connected to the output A-1 and the output B-1 cannot be used in common, and the switching elements are provided corresponding to the respective lines 551, 552, 553, 554 respectively.

As has been explained heretofore, according to this embodiment, the number of elements of the decoder circuit can be minimized and hence, the circuit scale of the decoder circuit can be reduced.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A drive circuit of a display device comprising a decoder circuit which outputs a tone voltage corresponding to a 8-bit digital value, wherein the decoder circuit comprises:
a first decoder circuit and a second decoder circuit which output one voltage respectively using upper-order 6 bits out of the 8-bit digital value;
a data selector circuit which outputs a selection signal from 3-bit digital data;
a selection circuit which receives two voltages outputted from the first decoder circuit and the second decoder circuit, and distributes the two voltages to three terminals using lower-order 2 bits out of the 8-bit digital value; and
an intermediate voltage output circuit which receives three voltages which is applied on the three terminals by the selection circuit, and outputs an intermediate voltage which is a one of five kinds of values based on the three voltages, wherein
the first decoder circuit and the second decoder circuit respectively include a select-switch-type decoder circuit which uses lower-order 3 bits out of the upper-order 6 bits, and a tournament-type decoder circuit which uses upper-order 3 bits out of the upper-order 6 bits,
the select-switch-type decoder circuit includes switching elements which receive the selection signal outputted from the data selector circuit and switch ON state in response to the selection signal,
the tournament-type decoder circuit includes switching elements for every bit, the switching elements of the lower-order bit select one of two values, and output the one of two values selected to the switching elements of upper-order bits, and the data selector circuit is used in common by the first decoder circuit and the second decoder circuit.

2. A drive circuit of a display device according to claim 1, wherein the decoder circuit further comprises a low-voltage-side decoder circuit and a high-voltage-side decoder circuit.

3. A drive circuit of a display device according to claim 2, wherein the low-voltage-side decoder circuit and the high-voltage-side decoder circuit include two lines which are connected to two inputs of the selection circuit.

4. A drive circuit of a display device according to claim 2, wherein the low-voltage-side decoder circuit and the high-voltage-side decoder circuit include two lines which are connected to two inputs of the selection circuit, and each of the two lines which has a switching element which controls the connection.

5. A drive circuit of a display device according to claim 1, wherein at least two of the switching elements in the select-switch-type decoder circuit receive a same tone voltage.

6. A drive circuit of a display device according to claim 1, wherein the intermediate voltage output circuit is a three-input one-output circuit, the intermediate voltage output circuit comprises:

a constant current source which passes a predetermined electric current;

a cascode transistor part which includes four transistors, in which either one of a source and a drain of each one of the four transistors is connected to the constant current source;

a group of differential pairs consisting of four sets of differential pairs each of which includes a first transistor and a second transistor, wherein either one of a source and a drain of the first transistor and either one of a source and a drain of the second transistor are both connected with either the other of the source and the drain of one of the four transistors of the cascode transistor part;

a current mirror transistor part which is constituted of a pair of transistors whose gate lines are connected with each other, and either ones of sources and drains of the pair of transistors are respectively connected with the other of the source and the drain of the first transistor of the differential pair, and the other of the source and the drain of the second transistor of the differential pair;

a first input terminal to which a gate line of the first transistor of a first differential pair of the four sets of differential pairs is connected;

a second input terminal to which both of a gate line of the first transistor of a second differential pair and a gate line of the first transistor of a third differential pair out of the four sets of differential pairs are connected;

the third input terminal to which a gate line of the first transistor of a fourth differential pair out of the four sets of differential pairs is connected; and an output terminal to which a gate line of the second transistor of all four sets of differential pairs is connected.

7. A drive circuit of a display device according to claim 6, wherein gate lines of the four transistors of the cascode transistor part are connected with each other.

* * * * *